United States Patent [19]
Yamada

[11] Patent Number: 5,852,531
[45] Date of Patent: Dec. 22, 1998

[54] SPINVALVE MAGNETORESISTIVE HEAD AND METHOD OF MANUFACTURING THE SAME AND MAGNETIC RECORDING/ REPRODUCING APPARATUS

[75] Inventor: Ken'ichiro Yamada, Kanagawa, Japan

[73] Assignee: Fujitsu Limited, Kawasaki, Japan

[21] Appl. No.: 855,851

[22] Filed: May 12, 1997

[30] Foreign Application Priority Data

Sep. 20, 1996 [JP] Japan ................................. 8-250709

[51] Int. Cl.$^6$ ........................................................ G11B 5/39
[52] U.S. Cl. ............................................................ 360/113
[58] Field of Search ............................ 360/113; 324/252; 338/32 R

[56] References Cited

U.S. PATENT DOCUMENTS 5,422,571 6/1995 Gurney et al. ....................... 324/252

*Primary Examiner*—Robert S. Tupper
*Attorney, Agent, or Firm*—Greer, Burns & Crain, Ltd.

[57] ABSTRACT

In a spinvalve magnetoresistive head comprises a free magnetic layer made of soft magnetic material, a nonmagnetic intermediate layer overlapped with the free magnetic layer, and a pinning magnetic layer overlapped with the nonmagnetic intermediate layer and made of soft magnetic material, magnetization angles of the free magnetic layer and the pinning magnetic layer relative to a track core width direction are set such that a resistance-magnetic field curve is made linear, whereby symmetry of the reproduced outputs can be improved.

26 Claims, 19 Drawing Sheets

D: Track core width direction
H4: Applied magnetic field direction

SPINVALVE MAGNETORESISTIVE HEAD AND METHOD OF MANUFACTURING THE SAME AND MAGNETIC RECORDING/ REPRODUCING APPARATUS

BACKGROUND OF THE INVENTION

1. Field of the Invention

The present invention relates to a spinvalve magnetoresistive head and a method of manufacturing the same and a magnetic recording/reproducing apparatus employing the spinvalve magnetoresistive head.

2. Description of the Prior Art

A high performance magnetic head is requested with the increase in capacity of a magnetic disk drive used as an external storage apparatus of a computer. As the magnetic head to meet this request, there has been a magnetoresistive head which can achieve high outputs not depending upon a transfer speed of a magnetic recording medium. As the magnetoresistive head, there have been an anisotropic magnetoresistive head (referred to as an AMR head hereinbelow) and an spinvalve magnetoresistive head (referred to as an SV magnetoresistive head hereinbelow). The AMR head has been incorporated actually into the magnetic recording/ reproducing apparatus as a product, but the SV magnetoresistive head has been in such a stage that it is being watched with interest as a next generation magnetic head.

The common SV magnetoresistive head has a structure shown in FIG. 1A. More particularly, a first nonmagnetic insulating layer 102 is formed on a first magnetic shielding layer 101. A free magnetic layer 103 made of NiFe, a nonmagnetic intermediate layer 104 made of Cu, a pinning magnetic layer 105 made of NiFe, and an antiferromagnetic layer 106 made of FeMn are formed in sequence on the first nonmagnetic insulating layer 102 respectively. Respective layers from the free magnetic layer 103 to the antiferromagnetic layer 106 are connected to each other and are patterned to have a rectangular plan shape on the first nonmagnetic insulating layer 102.

As shown in FIG. 1B, a magnetization easy axis M1 of the free magnetic layer 103 is present along the longitudinal direction (y direction in FIG. 1B). A direction of magnetization M2 of the pinning magnetic layer 105 is directed by an exchange coupling force between the antiferromagnetic layer 106 and the pinning magnetic layer 105 at angle 90° with a track core width direction D (y direction in FIG. 1B). The free magnetic layer 103 is biased by a magnetic field generated by magnetic charges of the pinning magnetic layer 105 and a magnetic field generated by a sense current J. A direction of magnetization Mol of the free magnetic layer 103 is directed at angle 0° with the track core width direction D, i.e., is directed in parallel with the track core width direction D.

A pair of leads 107, 108 made of gold or tungsten are connected to both ends of the track core width direction D of the antiferromagnetic layer 106. Respective layers from the free magnetic layer 103 to the antiferromagnetic layer 106 and the leads 107, 108 are covered with a second nonmagnetic insulating layer 109. In addition, a second magnetic shielding layer 110 is formed on the second nonmagnetic insulating layer 109. A clearance formed between the first magnetic shielding layer 101 and the second magnetic shielding layer 110 corresponds to a reproducing gap.

The x, y, z directions in FIG. 1A constitute an orthogonal coordinate. This is true similarly of other drawings.

Since the direction of magnetization Mol of the free magnetic layer 103 is changed from its magnetization easy axis M1 according to an applied external magnetic field, electric resistance between two leads 107, 108 is caused to the change corresponding to change in the direction of magnetization Mol. The change in electric resistance due to a change in the magnetization direction is called a magnetoresistive effect. Spinvalve magnetoresistive effect (referred to as an "SVMR effect" hereinafter), anisotropic magnetoresistive effect (referred to as an "AMR effect" hereinafter), etc. may be considered as the magnetoresistive effect.

The SVMR effect is such a magnetoresistive effect that electric resistance is a changed due to change in the relative angle between the magnetization directions of the free magnetic layer 103 and the pinning magnetic layer 105. In contrast, the AMR effect is such a magnetoresistive effect that electric resistance is a changed due to change in the relative angle between the direction of the sense current J flowing through the magnetic layer and the magnetization direction of the magnetic layer. The sense current J is a constant current.

In other words, as shown in FIGS. 1A and 1B, not only magnetic resistance due to the SVMR effect but also magnetic resistance due to the AMR effect are changed according to change in the magnetization direction of the free magnetic layer 103.

Assuming that the magnetization angle of the pinning magnetic layer is set at an angle of 90° with the track core width direction D and the magnetization direction of the free magnetic layer is set at an angle of θf with the track core width direction, change in the electric resistance value due to the SVMR effect is varied as a function of $\sin \theta f$ whereas change in the electric resistance value due to the AMR effect is varied as a function of $\cos^2 \theta f$. Such change in the electric resistance value can be detected by flowing the sense current J between the leads 108, 109 as the change in voltage of the sense region between the leads 108, 109.

According to the SV magnetoresistive head having the structure as described above, a relationship between a resistance ρ and an applied magnetic field H generated by the AMR effect and the SVMR effect is shown in FIG. 2. Further, isolated reproduced output waveforms of the SV magnetoresistive head which are generated by two upper and lower magnetic fields relative to the surface of the magnetic recording medium 111, for example, are shown in FIG. 3 respectively.

As evident from a broken line in FIG. 2, if for example the magnetization direction of the free magnetic layer 103 changes in the upward or downward direction relative to the surface of the magnetic recording medium 111, resistance change due to the SVMR effect is increased or decreased continuously and linearly. Moreover, if the case where the magnetization direction of the free magnetic layer 103 changes upwardly and the case where the magnetization direction of the free magnetic layer 103 changes downwardly are compared with each other, as shown by a broken line in FIG. 3, the reproduced outputs due to the SVMR effect appear symmetrically.

According to the AMR effect, even if as shown by a dot-dash line in FIG. 2 the magnetization direction of the free magnetic layer changes upwardly or downwardly with respect to the surface of the magnetic recording medium, such magnetization directions may provide similar resistance change and similar reproduced outputs and therefore appear asymmetrically, as shown by a dot-dash line in FIG. 3.

In the SV magnetoresistive head, change in the electric resistance due to the SVMR effect is large while change in the electric resistance due to the AMR effect is small, but a total magnetoresistive effect appears as a sum of changes in the electric resistance. Therefore, as shown by a solid line in FIG. 3, the reproduced signal detected by the magnetic head become asymmetric because of nonlinearity of the AMR effect. An allowable range of asymmetry has been in general recognized as ±10%. Therefore, asymmetry appearing beyond the range −10% to +10% makes signal demodulation by a signal demodulation circuit difficult even when various parameters are optimized, whereby there has been a problem that an error rate is degraded.

However, as shown in FIG. 3, asymmetry caused by the SV magnetoresistive head in the prior art is almost −14%, which is larger than ±10%.

SUMMARY OF THE INVENTION

The present invention has been made in view of the above problems, and it is an object of the present invention to provide a spinvalve magnetoresistive head capable of suppressing asymmetry of reproduced signals in a range of −10% to +10% and a method of manufacturing the same, and a magnetic recording/reproducing apparatus employing the spinvalve magnetoresistive head.

Subsequently, an operation of the present invention will be explained.

According to the present invention, a resistance-magnetic field curve ($\rho$-H curve) can be made linear over a practical range by adjusting magnetization directions of the free magnetic layer and the pinning magnetic layer constituting the spinvalve magnetoresistive head. In other words, the spinvalve magnetoresistive effect is enhanced by adjusting the magnetization directions, or the overall $\rho$-H curve is made linear by reducing the anisotropic magneto-resistive effect in the free magnetic layer.

Reduction in the anisotropic magnetoresistive effect is made possible by including elements such as boron, carbon, nitrogen into CoFe and NiFe constituting the free magnetic layer and the pinning magnetic layer.

If the $\rho$-H curve becomes linear, symmetry of the reproduced outputs can be improved still further. Thus asymmetry can be reduced in the range from −10% to +10% so that demodulation can be facilitated with good precision.

In addition, adjustment of the magnetization directions of the free magnetic layer and the pinning magnetic layer is made possible by changing an application direction of the external magnetic field in forming the film of these magnetic layers, or changing a magnetization direction of the external magnetic field in a heating atmosphere after the films being formed.

Other and further objects and features of the present invention will become obvious upon an understanding of the illustrative embodiments about to be described in connection with the accompanying drawings or will be indicated in the appended claims, and various advantages not referred to herein will occur to one skilled in the art upon employing of the invention in practice.

DESCRIPTION OF THE PREFERRED EMBODIMENTS

Figure 1A:
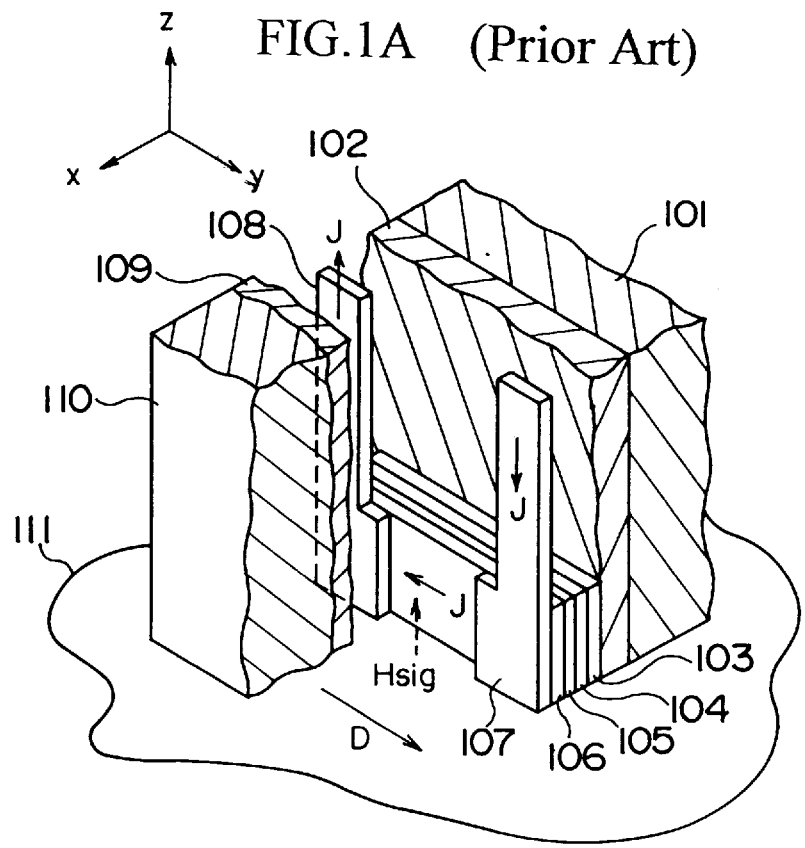
FIG. 1A is a perspective view showing a spinvalve magnetoresistive head in the prior art.
Figure 1B:
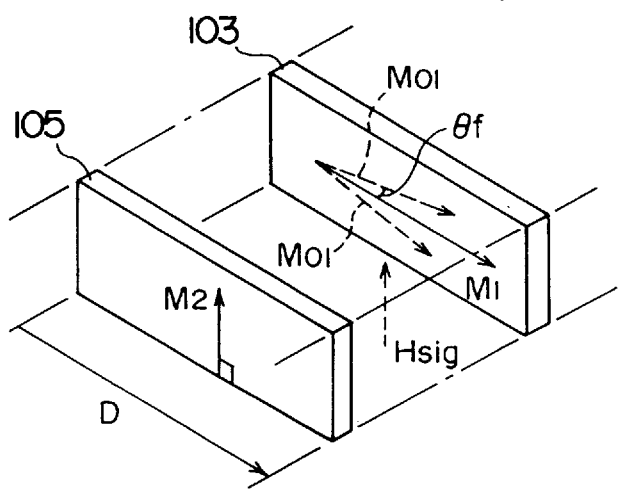
FIG. 1B is a perspective view showing magnetizing directions of a free magnetic layer and a pinning magnetic layer of the magnetoresistive head in FIG. 1A.

Various embodiments of the present invention will be described with reference to the accompanying drawings. It should be noted that the same or similar reference numerals are applied to the same or similar parts and elements throughout the drawings, and the description of the same or similar parts and elements will be omitted or simplified.

Figure 4A:
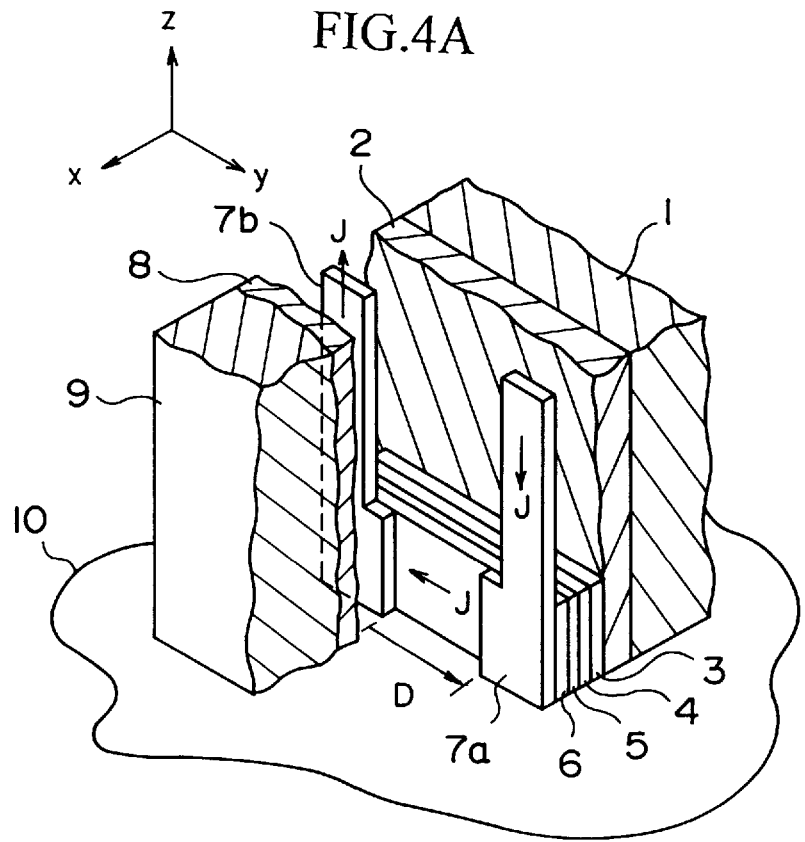
FIG. 4A is a perspective view showing a spinvalve magnetoresistive head according to an embodiment of the present invention.
Figure 4B:
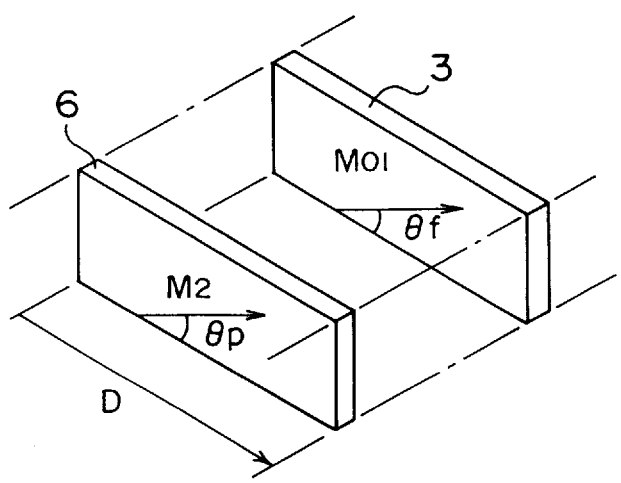
FIG. 4B is a perspective view showing magnetizing directions of a free magnetic layer and a pinning magnetic layer of the magnetoresistive head in FIG. 4A.

FIGS. 4A and 4B are perspective views showing a spinvalve magnetoresistive head according to an embodiment of the present invention.

In FIG. 4A, a first nonmagnetic insulating layer 2 is formed on a first magnetic shielding layer 1. A free magnetic layer 3, a nonmagnetic intermediate layer 4, a pinning magnetic layer 5, and an antiferromagnetic layer 6 are formed in sequence on the first nonmagnetic insulating layer 2 respectively. The free magnetic layer 3 to the antiferromagnetic layer 6 are patterned to have a rectangular plan shape on the first nonmagnetic insulating layer 2. The free magnetic layer 3 and the pinning magnetic layer 5 are made of soft magnetic material respectively.

As shown in FIG. 4B, a direction of magnetization M01 of the free magnetic layer 3 is directed at angle θf with a track core width direction D (y direction in FIG. 4B). A direction of magnetization M2 of the pinning magnetic layer 5 is directed at angle θp with the track core width direction D by virtue of an exchange coupling force between the antiferromagnetic layer 6 and the pinning magnetic layer 5.

A pair of leads 7a, 7b made of gold or tungsten are formed near both ends of the track core width direction D of the antiferromagnetic layer 6. Respective layers from the free magnetic layer 3 to the antiferromagnetic layer 6 and the leads 7a, 7b are covered with a second nonmagnetic insulating layer 8. A second magnetic shielding layer 9 is formed on the second nonmagnetic insulating layer 8. A clearance formed between the first magnetic shielding layer 1 and the second magnetic shielding layer 9 serves as a reproducing gap.

Figure 3:
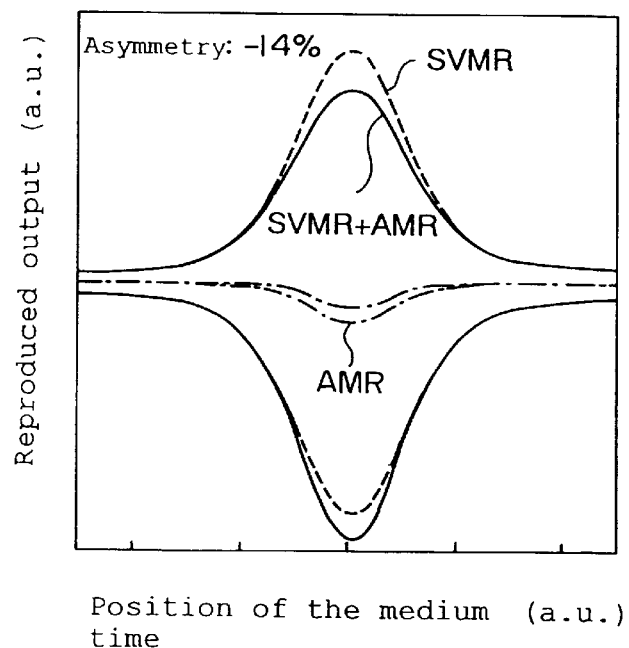
FIG. 3 is a chart showing reproduced output waveforms by the spinvalve magnetoresistive head in FIG. 1A.

It will be explained hereinbelow how asymmetry of reproduced output shown in FIG. 3 is to be changed according to changes in the angle θf of magnetization of the free magnetic layer 3 and the angle θp of magnetization of the pinning magnetic layer 5 in such SV magnetoresistive head.

Figure 2:
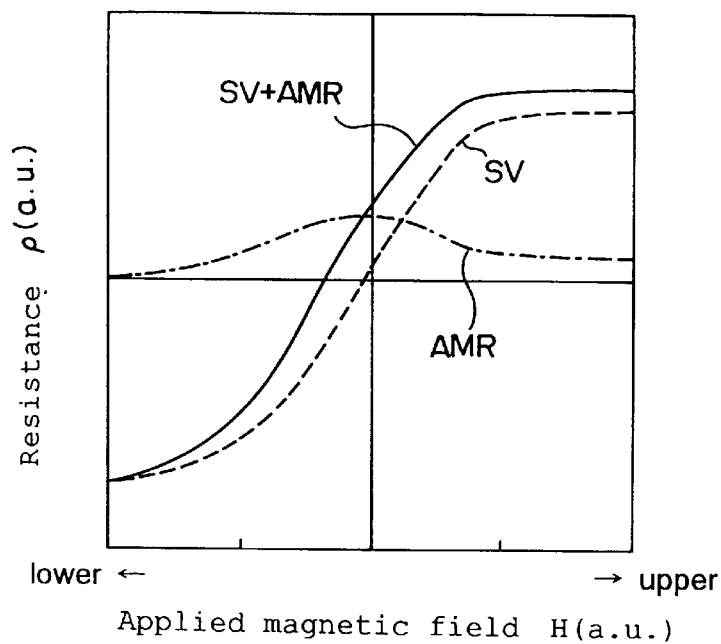
FIG. 2 is a characteristic view showing a $\rho$-H curve of the spinvalve magnetoresistive head in FIG. 1A.

First, following Eq. (1) will be given if the ρ-H curve of the SV magnetoresistive head shown in FIG. 2 is analyzed by using a quadratic equation. The reason why the quadratic equation is used in analysis is that the angles θf, θp are locally different. Where ρ(H) is a function showing the ρ-H curve on which SVMR effect and AMR effect of the SV magnetoresistive head is superposed, and ρ(H) is a function obtained when a magnetic field is zero.

$$\rho_{(H)} = \rho_{(0)} + H\rho'_{(0)} + \frac{1}{2} H^2 \rho'' \quad (1)$$

Assuming that a resistance change amount caused when the magnetic field H is slightly changed into the +direction is denoted by V(+) and a resistance change amount caused when the magnetic field H is slightly changed into the — direction is denoted by V(−), such V(+) and V(−) are expressed respectively as $$\begin{aligned} V_{(+)} &= \rho_{(\Delta H)} - \rho_{(0)} \\ &= \Delta H \rho'_{(0)} + \frac{1}{2} \Delta H^2 \rho''_{(0)} \end{aligned} \quad (2)$$

$$V_{(-)} = \rho_{(0)} - \rho_{(-\Delta H)} = \Delta H \rho'_{(0)} - \frac{1}{2} \Delta H^2 \rho''_{(0)} \quad (3)$$

Where asymmetry of reproduced outputs by the SV magnetoresistive head is defined as $$\text{Asym} = \frac{V_{(+)} - V_{(-)}}{V_{(+)} + V_{(-)}} = \frac{\rho''_{(0)}}{\rho'_{(0)}} \cdot \frac{\Delta H}{2} \quad (4)$$

Asymmetry shown in Eq. (4) can be derived if a ratio of the result of second differentiation of ρ(0) by the magnetic field H to the result of first differentiation of ρ(0) by the magnetic field H is multiplied by the applied magnetic field ΔH.

Next, if Eq. (1) is expressed as functions of the angle θf of magnetization of the free magnetic layer 3 and the angle θp of magnetization of the pinning magnetic layer 5, $$\rho = \rho_0 + \Delta\rho_{SV}\left(-\frac{1}{2}\cos(\theta_p - \theta_f) + amr \cdot \cos^2\theta_f\right) \quad (5)$$

can be derived. Where amr is a ratio of resistance change due to SVMR effect and resistance change due to AMR effect. In other words, if resistance change due to SVMR effect is assumed to ΔρSV, resistance change due to AMR effect ΔρA can be expressed by ΔρA=amr·ΔρSV. In addition, ρ(0) is a function of the resistance from which resistance change due to the magnetoresistive effect is removed.

Provided the angle θp of magnetization of the pinning magnetic layer 5 is fixed by virtue of the exchange coupling force between the pinning magnetic layer 5 and the antiferromagnetic layer 6, the first differentiation of ρ(0) by the magnetic field H will be given by $$\rho'_{(0)} = \frac{\partial\rho}{\partial H} = \left(\frac{\partial \sin\theta_f}{\partial H}\right)\frac{\partial\rho}{\partial \sin\theta_f} \quad (6)$$

and also the second differentiation of ρ(0) by the magnetic field H will be given by $$\rho''_{(0)} = \frac{\partial^2\rho}{\partial H^2} = \left(\frac{\partial \sin\theta_f}{\partial H}\right)^2 \frac{\partial^2\rho}{\partial \sin\theta_f^2} + \left(\frac{\partial^2\sin\theta_f}{\partial H^2}\right)\frac{\partial\rho}{\partial \sin\theta_f} \quad (7)$$

In addition, the result of the first differentiation of ρ by sine θf can be given by $$\frac{\partial \rho}{\partial \sin \theta_f} = \frac{1}{2} \Delta\rho_{SV}((\cos \theta_p \tan \theta_f - \sin \theta_p) - 4\, amr \cdot \sin \theta_f) \quad (8)$$

and also the second differentiation of $\rho$ by $\sin \theta f$ can be given by $$\frac{\partial^2 \rho}{\partial \sin \theta_f^2} = \frac{1}{2} \Delta\rho_{SV} \left( \frac{\cos \theta_p}{\cos^3 \theta_f} - 4\, amr \right) \quad (9)$$

Substituting Eqs. (6) to (9) into Eq. (4) expressing a function Asym of asymmetry yields $$\text{Asym} = \quad (10)$$

$$\left\{ \frac{\dfrac{\cos \theta_p}{\cos^3 \theta_f} - 4\, amr}{\cos \theta_p \tan \theta_f - \sin \theta_p - 4\, amr \cdot \sin \theta_f} \left( \frac{\partial \sin \theta_f}{\partial H} \right) + \frac{\left( \dfrac{\partial^2 \sin \theta_f}{\partial H^2} \right)}{\left( \dfrac{\partial \sin \theta_f}{\partial H} \right)} \right\} \frac{\Delta H}{2}$$

The first term of Eq. (10) shows asymmetry in the sum of the SVMR effect and the AMR effect. The second term of Eq. (10) shows asymmetry which is caused by the applied magnetic field H of sin θf in the free magnetic layer 3.

Figure 5:
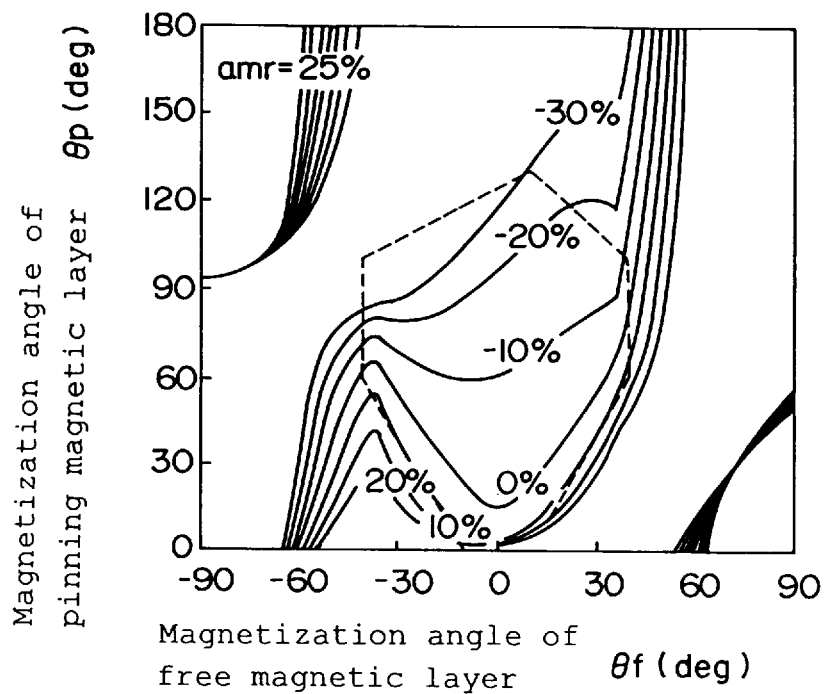
FIG. 5 is a characteristic view showing a first example of asymmetrical magnetization angle dependence appeared in a reproduced output of the spinvalve magnetoresistive head according to the embodiment of the present invention.
Figure 6:
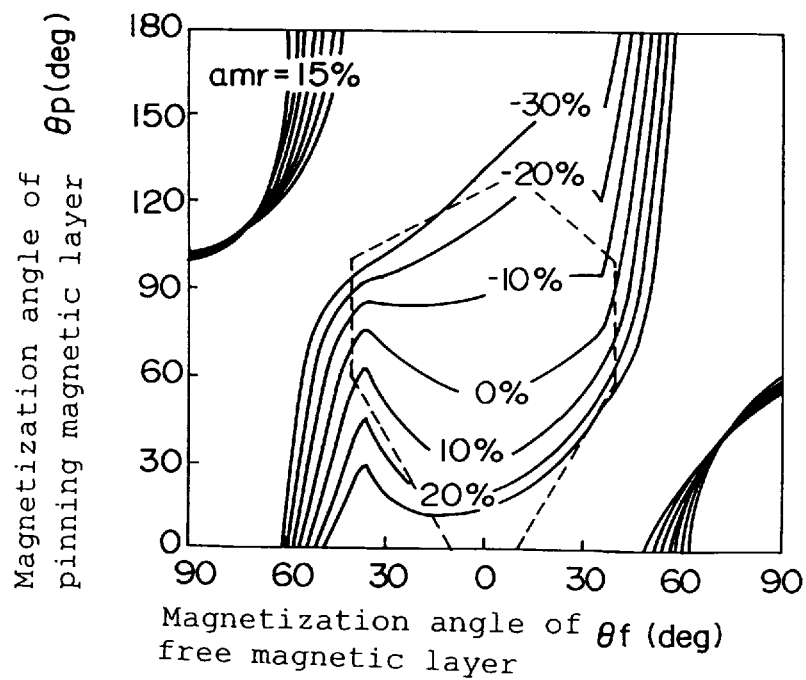
FIG. 6 is a characteristic view showing a second example of asymmetrical magnetization angle dependence appeared in a reproduced output of the spinvalve magnetoresistive head according to the embodiment of the present invention.
Figure 7:
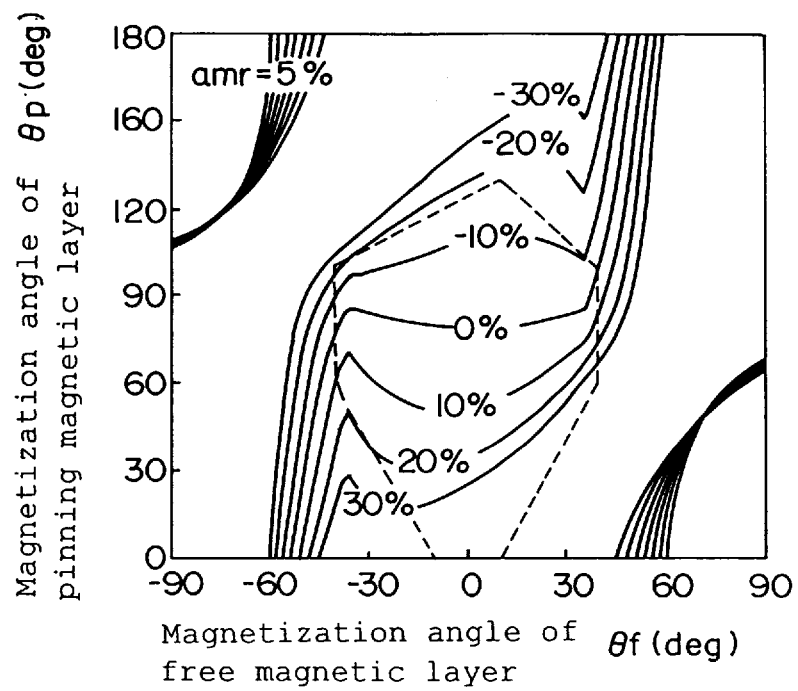
FIG. 7 is a characteristic view showing a third example of asymmetrical magnetization angle dependence appeared in a reproduced output of the spinvalve magnetoresistive head according to the embodiment of the present invention.

If asymmetry is calculated based on Eq. (10), the results can be obtained as shown in FIGS. 5 to 7. Where distribution of asymmetry is illustrated with the use of a coordinate system wherein the angle θf of magnetization of the free magnetic layer 3 is assumed as the lateral axis while the angle θp of magnetization of the pinning magnetic layer 5 is assumed as the vertical axis.

FIG. 5 shows distribution of asymmetry if amr of the SV magnetoresistive head is set to 25%, FIG. 6 also shows distribution of asymmetry if amr of the SV magnetoresistive head is set to 15%, and FIG. 7 also shows distribution of asymmetry if amr of the SV magnetoresistive head is set to 5%.

In FIGS. 5 to 7, an inside of a heptagonal area shown by a broken line is actually applicable to a product. This is because contour-lines of asymmetry are dense in areas other than the heptagonal area so that asymmetry is hard to be determined. As a result, signal demodulation is made difficult. Still further, if the angle θf of magnetization of the free magnetic layer 3 is out of the range from −40° to +40°, asymmetry is enhanced.

Coordinate values of respective vertices (θf, θp) of the heptagon in FIGS. 5 to 7 are (−10°, 0°), (40°, 60°), (−40°, 100°), (10°, 130°), (40°, 100°), (40°, 60°) and (10°, 0°).

In general, in the ordinary reproducing magnetic head, a response of sin θf to the applied magnetic field H in the second term of Eq. (10) meets a linear requirement and is also sufficiently small rather than the first term. For this reason, it would be understood that only the first term affects mainly asymmetry. Therefore, asymmetry can be expressed by $$\text{Asym} \approx \frac{\dfrac{\cos \theta_p}{\cos^3 \theta_f} - 4\, amr}{\cos \theta_p \tan \theta_f - \sin \theta_p - 4\, amr \cdot \sin \theta_f} \left( \frac{\partial \sin \theta_f}{\partial H} \right) \frac{\Delta H}{2} \quad (11)$$

In order to reduce asymmetry up to 0%, it is important to make [(cosθp/cos3θf)−4amr] in numerator in Eq. (11) zero. Thus, it is preferable that Eq. (11) is made close to zero by selecting an angle other than 90° as the angle θp of magnetization of the pinning magnetic layer 5.

In the conventional SV magnetoresistive heat shown in FIG. 1A, the angle θp of magnetization of the pinning magnetic layer 5 is selected to 90° while the angle θf of magnetization of the free magnetic layer 3 is selected to 0°.

However, as can be seen from FIGS. 5 to 7, asymmetry does not reside on the 0% contour-line at such magnetization angles θf, θp. For instance, asymmetry becomes about 15% on a point in FIG. 5 where the angles θp are 90° and the angles θf are 0°. The reason is that, since cos θp is included in the first term of the numerator of Eq. (11), only −4amr in the second term derived from the AMR effect remains and therefore asymmetry is in proportion to −4amr.

Even if the bias position, i.e., the magnetization angle of the free magnetic layer 3, is changed, only a denominator of Eq. (11) is changed correspondingly so that −4amr of the numerator is not changed essentially. Thus, in the SV magnetoresistive head in which the angle θp of magnetization of the pinning magnetic layer 5 is 90°, essentially asymmetry never becomes 0% but minus at all times. This event is shown in FIGS. 5 to 7. The angles θf, θp become minus if they are made to be inclined from the track core width direction D to the magnetic recording medium 10 side, while the angles θf, θp become plus if they are made to be inclined from the track core width direction D to the opposite side.

In order to suppress asymmetry within ±10%, asymmetry derived from the AMR effect can be canceled by inclining the magnetization angle of the pinning magnetic layer 5.

It can be seen from FIGS. 5 to 7 that asymmetry can be reduced up to 0% if the angle θp of magnetization of the pinning magnetic layer 5 is combined with the angle θf of magnetization of the free magnetic layer 3. This is because, if the angle θp is set to an angle other than 90°, there exist such angles θp, θf of magnetization of the pinning magnetic layer 5 and the free magnetic layer 3 that the first term of the numerator of Eq. (10) becomes plus because of cos θp and is then canceled by −4amr in the second term derived from the AMR effect to thus make the numerator of Eq. (10) zero.

Such angles θp, θf of magnetization of the pinning magnetic layer 5 and the free magnetic layer 3 exist in response to any amr in any SV magnetoresistive head. In this fashion, if the angle θp of magnetization of the pinning magnetic layer 5 and the bias position, i.e., the angle θf of magnetization of the free magnetic layer 3 are selected appropriately to the amr, it is possible to reduce asymmetry to 0% or within less than the sufficiently allowable range of ±10%. Where amr is defined as a ratio of resistance changes due to the AMR effect and the SVMR effect.

Even in case the magnetization angle of the pinning magnetic layer 5 is 90°, asymmetry can be made within the sufficiently allowable range. In this event, reduction of amr is required.

With the above description, it has been found that asymmetry can be made small by employing the SV magnetoresistive head that has small amr.

Figure 8:
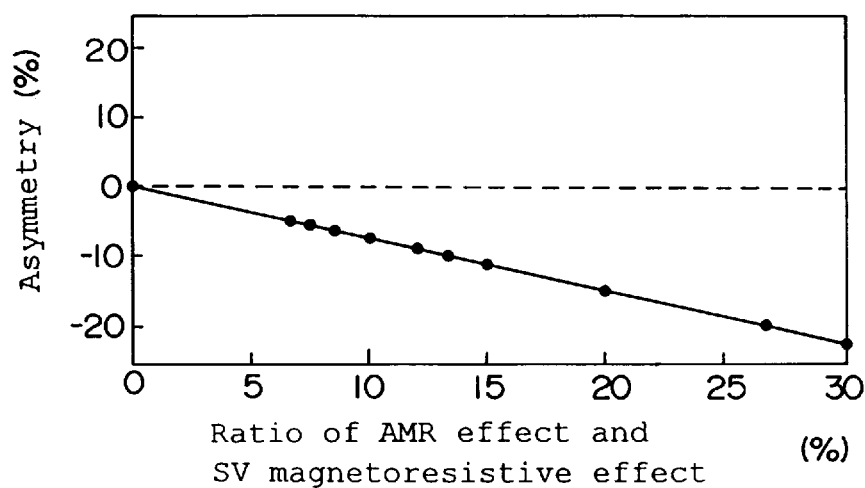
FIG. 8 is a characteristic view showing a relationship between a ratio of an AMR effect and an SVMR effect and asymmetry in the spinvalve magnetoresistive head according to the embodiment of the present invention.

FIG. 8 is a graph showing a relationship between amr and asymmetry in the spinvalve magnetoresistive head. Like this, asymmetry can be improved smaller than the allowable range −10% by reducing amr less than 15%. Amr denotes a ratio of resistance changes due to the AMR effect and the SVMR effect in the SV magnetoresistive head. Hence, there may be considered two ways as means for reducing amr.

A first way is reduction of the AMR effect in the free magnetic layer 3 per se while a second way is increase of the SVMR effect.

Figure 9:
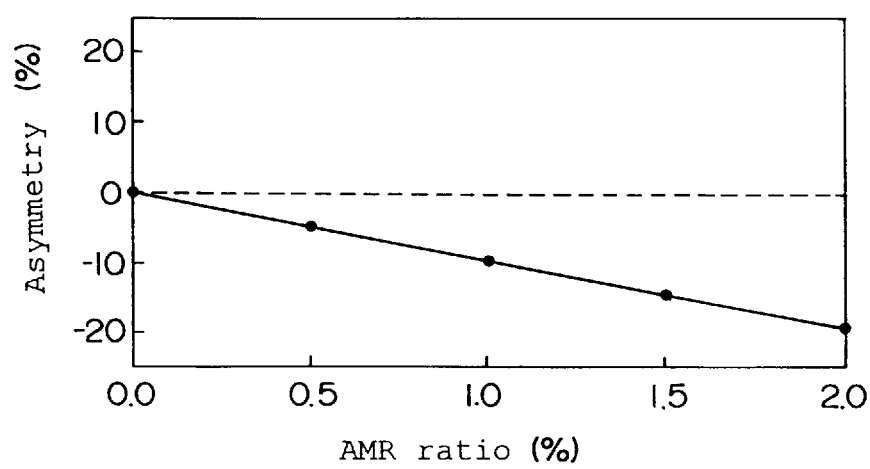
FIG. 9 is a characteristic view showing a relationship between asymmetry and an AMR effect of a free magnetic layer single film in the spinvalve magnetoresistive head according to the embodiment of the present invention.

To begin with, reduction of the AMR effect will be explained. FIG. 9 is a graph showing a relationship between asymmetry and the AMR effect of the free magnetic layer 3 single film. In this manner, asymmetry has been improved uniformly according to reduction in the AMR effect. This indicates the fact that asymmetry is caused by the AMR effect.

Accordingly, it would be understood that reduction of the AMR effect is significantly effective to suppress asymmetry. In order to reduce asymmetry within −10% or less, the AMR effect in the free magnetic layer 3 single film has to be less than 1%. In FIG. 9, the AMR ratio along the lateral axis indicates maximum and minimum resistance values due to the AMR effect.

Next, function of increase of the SVMR effect will be explained with reference to FIG. 10.

Figure 10:
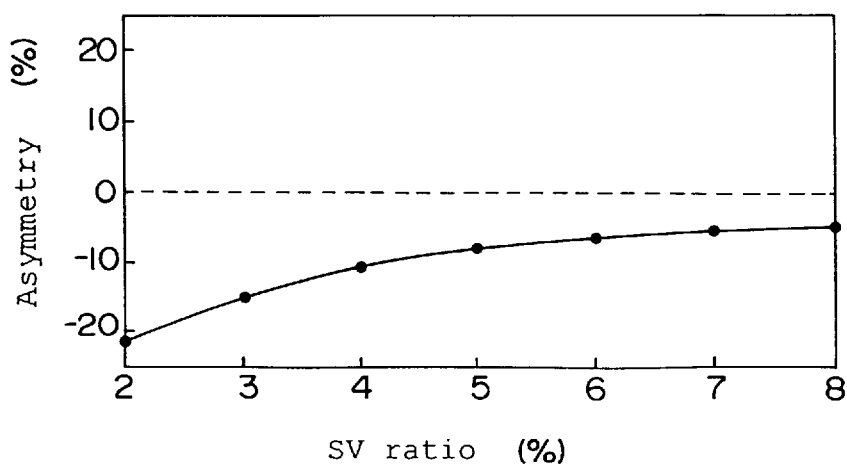
FIG. 10 is a characteristic view showing a relationship between asymmetry and an SVMR effect in the spinvalve magnetoresistive head according to the embodiment of the present invention.

FIG. 10 is a graph showing a relationship between asymmetry and the SVMR effect. In this manner, it can be appreciated that reduction in asymmetry is in inverse proportion to increase in the SVMR effect. This suggests that the cause of asymmetry is not derived from the SVMR effect. That is, asymmetry is relatively reduced in accordance with increase in the reproduced output which is caused by the increase of the SVMR effect. In order to improve asymmetry to be reduced less than the allowable range −10%, it is understood that the SVMR effect must be increased in excess of 4%.

The SV ratio in FIG. 10 shows a ratio of maximum and minimum resistance values due to the SVMR effect.

Taking into account the above explanation, an example of the SV magnetoresistive head will be explained hereinbelow wherein asymmetry can be improved by setting respective magnetization angles of the free magnetic layer 3 and the pinning magnetic layer 5 differently from conventional magnetization angles.

(FIRST EXAMPLE)

Figure 11A:
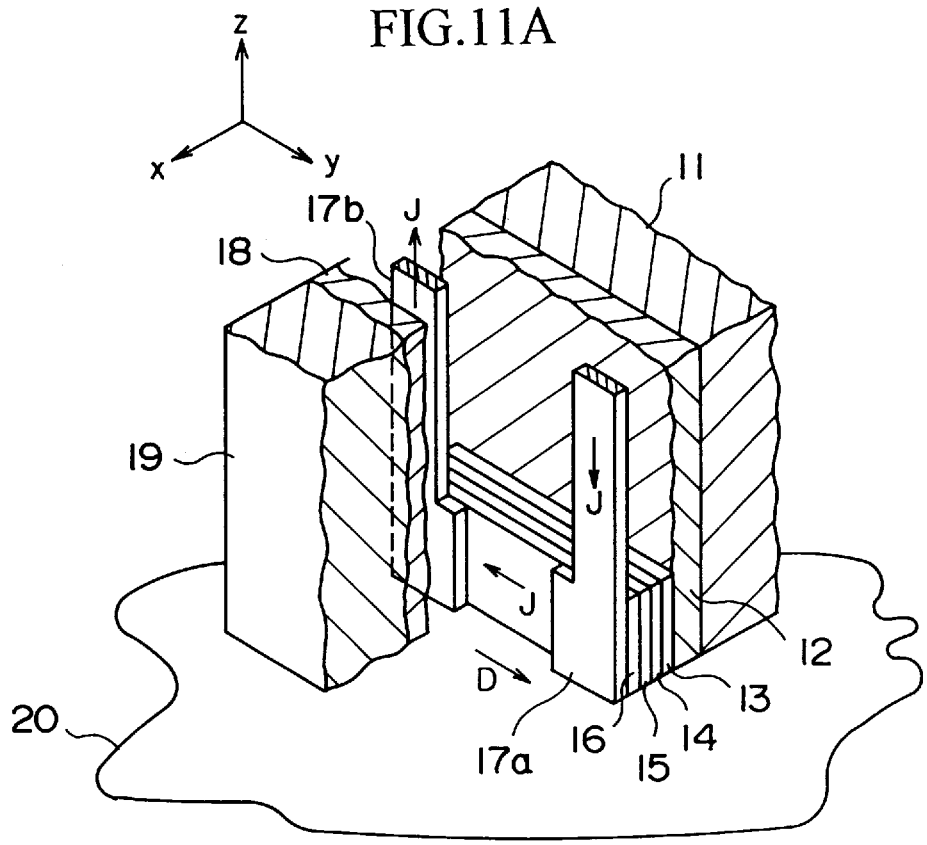
FIG. 11A is a perspective view showing a first concrete example of the spinvalve magnetoresistive head according to the embodiment of the present invention.

FIG. 11A is a perspective view showing a pertinent portion of the SV magnetoresistive head.

A first nonmagnetic insulating layer 12 made of Al2O3 is formed on a first magnetic shielding layer 11 made of NiFe. A free magnetic layer 13 made of NiFe, a nonmagnetic intermediate layer 14 mad of Cu, a pinning magnetic layer 15 made of NiFe, and an antiferromagnetic layer 16 made of FeMn are formed in order on the first nonmagnetic insulating layer 12 respectively. In this case, a film thickness of the free magnetic layer 13 is 7.5 nm, a film thickness of the nonmagnetic intermediate layer 14 is 3 nm, a film thickness of the pinning magnetic layer 15 is 3 nm, and a film thickness of the antiferromagnetic layer 16 is 10 nm.

The free magnetic layer 13 to the antiferromagnetic layer 16 are connected electrically with each other and are patterned to have a rectangular plan shape on the first nonmagnetic insulating layer 12. Furthermore, a pair of leads 17a, 17b made of gold or tungsten are formed on both ends of the antiferromagnetic layer 16.

The antiferromagnetic layer 16 and the leads 17a, 17b, etc. on the first nonmagnetic insulating layer 12 are covered with a second nonmagnetic insulating layer 18 made of Al2O3. A second magnetic shielding layer 19 made of NiFe is formed on the second nonmagnetic insulating layer 18.

Figure 11B:
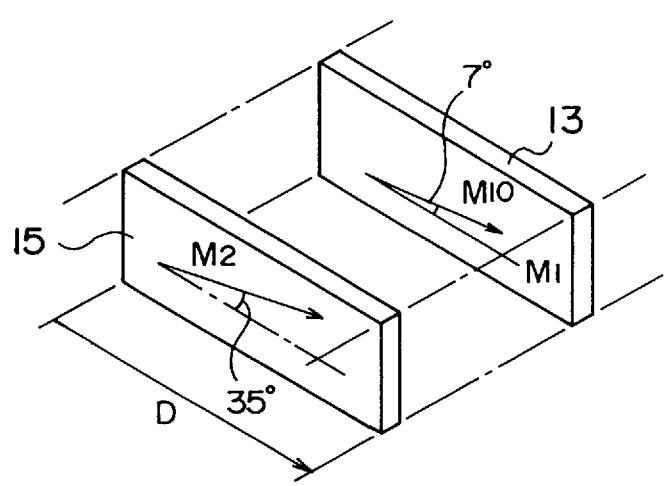
FIG. 11B is a perspective view showing magnetizing directions of a free magnetic layer and a pinning magnetic layer of the magnetoresistive head in FIG. 11A.

In such SV magnetoresistive head, as shown in FIG. 11B, a magnetization easy axis M1 of the free magnetic layer 13 is substantially parallel with a surface of a magnetic recording medium 20 and has the same direction as the track core width direction D. Then, a direction of magnetization M10 of the free magnetic layer 13 is inclined by +7° from the magnetization easy axis M1 if the sense current J is passed through the sense region between two leads 17a, 17b.

A direction of the magnetization M2 of the pinning magnetic layer 15 is directed at angle +35° with the track core width direction D in virtue of the exchange coupling force between the pinning magnetic layer 15 and the antiferromagnetic layer 16. The angles of the magnetization directions relative to the track core width direction D become minus if they are inclined from the track core width direction D to the magnetic recording medium 20 side, while they become plus if they are inclined from the track core width direction D to the opposite side.

If the angle between the direction of the sense current J and the direction of magnetization M10 is changed due to the AMR effect, an electric resistance value is varied in the free magnetic layer 13. As antiparallel components of the directions of the magnetization M10 and the magnetization M2 due to the SVMR effect are increased, the resistance values are increased in the free magnetic layer 13 and the pinning magnetic layer 15. On the contrary, as parallel components of the directions of the magnetization are increased, their resistance values are reduced.

Meanwhile, it has already been described that, if signal magnetic fields output from the magnetic recording medium 20 in the positive direction and signal magnetic fields thereof in the opposite direction are reproduced by the SV magnetic head, these two reproduced signals are formed symmetrically with respect to a certain value. The more perfect symmetry would be of course desired, but actually symmetry is deteriorated due to the AMR effect of the free magnetic layer 13.

In the SV magnetoresistive head shown in FIGS. 11A and 11B, a resistance change due to the SVMR effect is 3% and a resistance change of the free magnetic layer 13 due to the AMR effect is 1.5%. Further, amr which denotes a ratio of the resistance change due to the SVMR effect and the resistance change due to the AMR effect is 20%.

Figure 12:
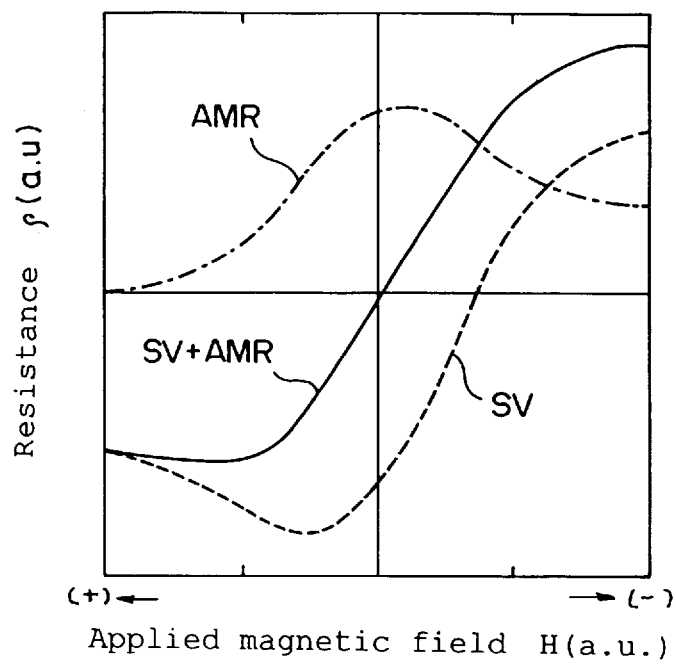
FIG. 12 is a characteristic view showing a $\rho$-H curve of the spinvalve magnetoresistive head in FIG. 11A.

Next, after the ρ-H curve derived from the magnetoresistive effect of the SV magnetoresistive head shown in FIG. 11A has been investigated, the result shown in FIG. 12 has been attained. In FIG. 12, it is evident that, since nonlinearity of the SVMR effect and nonlinearity of the AMR effect appear oppositely to each other, linearity of the magnetoresistive effect of the SV magnetoresistive head derived as a sum of these two magnetoresistive effects becomes very good.

By making use of an inductive magnetic head, magnetic data is written into a first bit on one track of a circular disk type magnetic recording medium 20 to generate a magnetic field in the upward direction and also magnetic data is written into a second bit to generate a magnetic field in the downward direction. Then, such magnetic data are reproduced by the SV magnetoresistive head shown in FIG. 11A.

Figure 13:
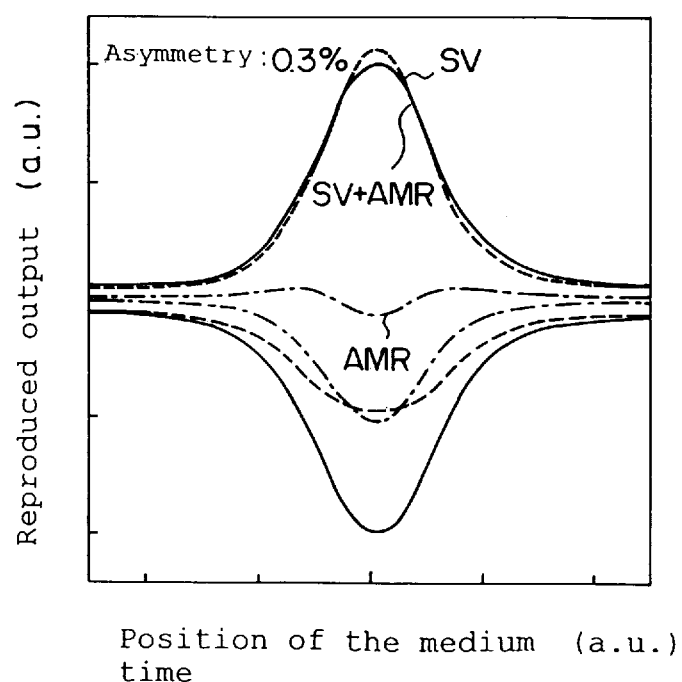
FIG. 13 is a chart showing reproduced output waveforms by the spinvalve magnetoresistive head in FIG. 11A.

For reproduced output waveforms of the magnetic data stored in the first bit, a first reproduced output waveform based on resistance changes due to both the SVMR effect and the AMR effect has been derived as a valley shape shown by a solid line in FIG. 13. For reproduced output waveforms of the magnetic data stored in the second bit, a second reproduced output waveform based on resistance changes due to both the SVMR effect and the AMR effect has been derived as a mountain shape shown by a solid line in FIG. 13. The reproduced outputs are output as voltage outputs which are in proportion to resistance change.

As a result, as can be seen from FIG. 12, asymmetry has been suppressed less than 1% in the waveform of the first reproduced output and the waveform of the second reproduced output, which is smaller than asymmetry in the prior art. This asymmetry is composed of values derived by Eq. (4) and from experimental results in FIG. 19, such values substantially coinciding with the values derived by Eq. (10) or Eq. (11).

In turn, manufacturing steps of the SV magnetoresistive head shown in FIG. 11A will be explained. Films constituting the SV magnetoresistive head are grown by the sputter equipment shown in FIG. 14.

A substrate supporting portion 22, on one surface of which a substrate is loaded, is arranged in a chamber 21 of the sputter equipment. Magnetic field generating means 23 for generating a magnetic field H10 in one direction in a substrate supporting area are positioned on both sides of the substrate supporting portion 22. A target 24 is positioned at a distance from the substrate supporting area on the substrate supporting portion 22. Pressure in the chamber 21 is lowered at back pressure $5 \times 10^{-5}$ Pa ($4 \times 10^{-7}$ Torr) upon sputtering, then an argon gas is introduced into the chamber 21, and then a film is formed at 0.3 Pa ($2 \times 10^{-3}$ Torr). A permanent magnet or an electromagnet may be used as the magnetic field generating means 23.

Figure 15A:
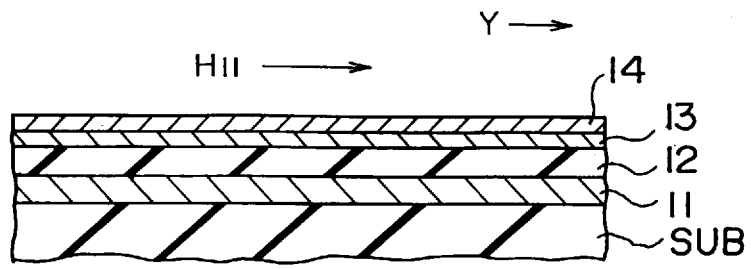
FIGS. 15A to 15D are sectional views illustrating manufacturing steps of the spinvalve magnetoresistive head according to the embodiment of the present invention in FIG. 11A.

Using the sputter equipment, as shown in FIG. 15A, first the first magnetic shielding layer 11 made of NiFe and the first nonmagnetic insulating layer 12 made of Al2O3 are formed on a substrate SUB made of alumina, titanium, carbon, etc. Then, the free magnetic layer 13 made of NiFe with a thickness of 7.5 nm and the nonmagnetic intermediate layer 14 made of Cu with a thickness of 3 nm are formed on the first nonmagnetic insulating layer 12.

In this case, the free magnetic layer 13 and the nonmagnetic intermediate layer 14 are formed in the magnetic field H11 which is generated by the magnetic field generating means 23 to have 100 Oe in one direction at room temperature. The direction of the magnetic field H11 corresponds to the magnetization easy axis of the free magnetic layer 13.

After this, the substrate supporting portion 22 and the substrate SUB positioned below the portion 22 are rotated from the magnetization easy axis by 35°.

Figure 15B:
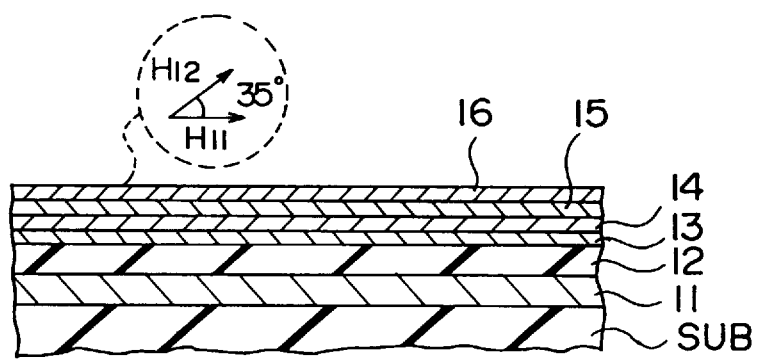

Subsequently, as shown in FIG. 15B, the pinning magnetic layer 15 made of NiFe with a thickness of 3 nm is formed on the nonmagnetic intermediate layer 14, then the antiferromagnetic layer 16 made of FeMn with a thickness of 10 nm is formed on the pinning magnetic layer 15. The pinning magnetic layer 15 and the antiferromagnetic layer 16 are formed in the magnetic field H12 of 100 Oe which is generated by the magnetic field generating means 23. Then, the substrate SUB is taken out from the sputter equipment.

Figure 15C:
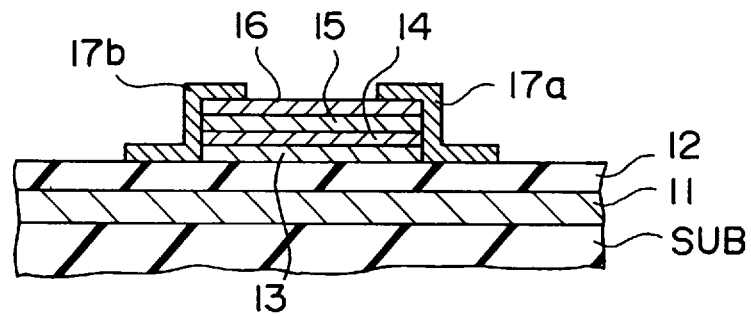

As shown in FIG. 15C, the free magnetic layer 13 to the antiferromagnetic layer 16 are patterned as a rectangle. Longer sides of the rectangle are directed along the direction which coincide with the magnetization easy axis of the free magnetic layer 13. Subsequently, a pair of leads 17a, 17b made of gold or tungsten are formed on both ends of the antiferromagnetic layer 16.

Figure 15D:
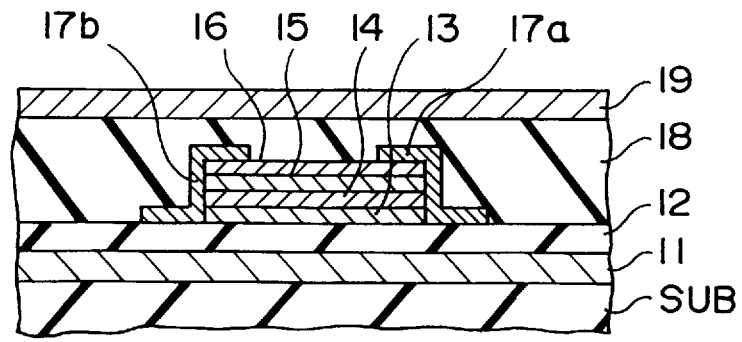

Then, as shown in FIG. 15D, the second nonmagnetic insulating layer 18 is formed by sputtering to cover the leads 17a, 17b, the antiferromagnetic layer 16, etc. The second magnetic shielding layer 19 made of NiFe is formed on the second nonmagnetic insulating layer 18.

Consequently, a basic structure of the SV magnetoresistive head shown in FIGS. 11A and 11B is completed.

Respective layers from the free magnetic layer 13 to the antiferromagnetic layer 16 may be stacked in forward order as above or reverse order.

(SECOND EXAMPLE)

Using cobalt-iron (CoFe) as material of the free magnetic layer in the SV magnetoresistive head has been proposed. The anisotropic magnetoresistive effect of the free magnetic layer can be suppressed by containing an element such as boron, carbon, or nitrogen into cobalt-iron. An example using such cobalt-iron will be explained hereinbelow.

Figure 16A:
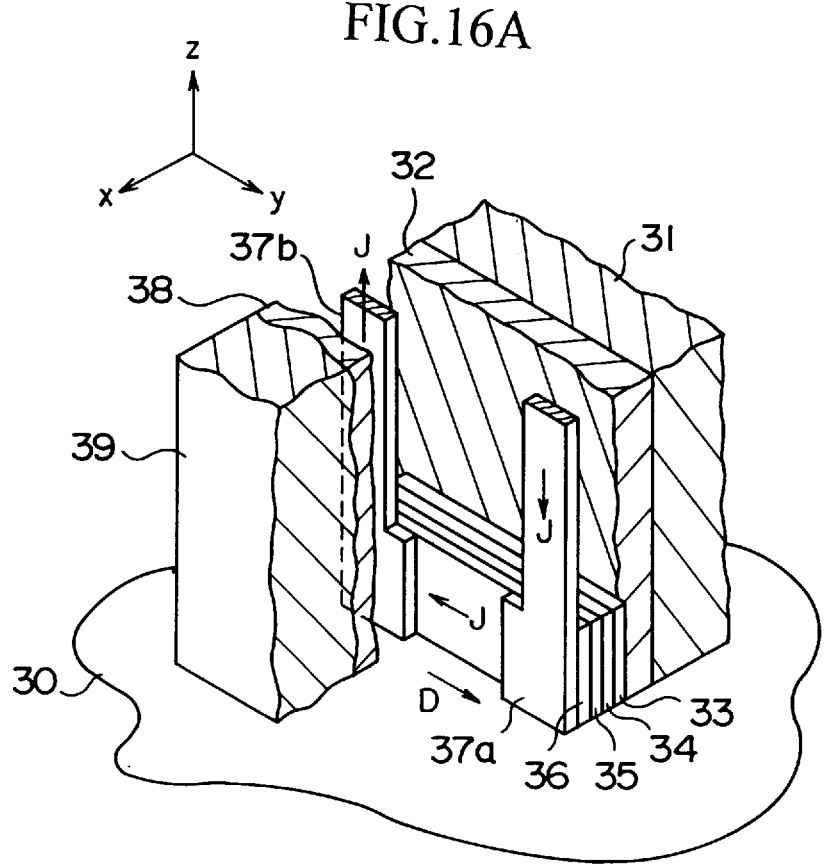
FIG. 16A is a perspective view showing a second concrete example of the spinvalve magnetoresistive head according to the embodiment of the present invention.

FIG. 16A is a perspective view showing a pertinent portion of the SV magnetoresistive head.

A first nonmagnetic insulating layer 32 made of Al2O3 is formed on a first magnetic shielding layer 31 made of NiFe. A free magnetic layer 33 made of NiFe is formed on the first nonmagnetic insulating layer 32. The free magnetic layer 33 has a double-layered structure made of an NiFe layer and a (Co90Fe10)90B10 layer. Suffixes in (Co90Fe10)90B10 show composition ratios (atoms %).

A nonmagnetic intermediate layer 34 mad of Cu, a pinning magnetic layer 35 made of (Co90Fe10)90B10, and an antiferromagnetic layer 36 made of FeMn are formed in order on the free magnetic layer 33 respectively.

In this case, a film thickness of the free magnetic layer 33 is 7.5 nm, a film thickness of the nonmagnetic intermediate layer 34 is 3 nm, a film thickness of the pinning magnetic layer 35 is 3 nm, and a film thickness of the antiferromagnetic layer 36 is 10 nm.

The free magnetic layer 33 to the antiferromagnetic layer 36 are mutually connected electrically and are patterned to have a rectangular plan shape on the first nonmagnetic insulating layer 32. Furthermore, a pair of leads 37a, 37b made of gold or tungsten are formed on both ends of the antiferromagnetic layer 36.

The antiferromagnetic layer 36 and the leads 37a, 37b, etc. on the first nonmagnetic insulating layer 32 are covered with a second nonmagnetic insulating layer 38 made of Al2O3. A second magnetic shielding layer 39 made of NiFe is formed on the second nonmagnetic insulating layer 38.

Figure 16B:
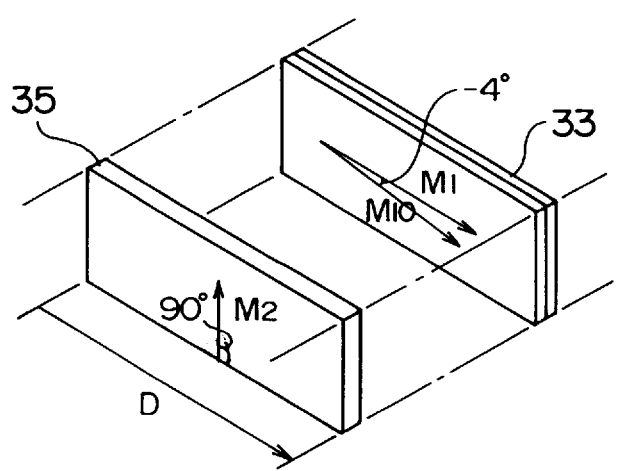
FIG. 16B is a perspective view showing magnetizing directions of a free magnetic layer and a pinning magnetic layer of the magnetoresistive head in FIG. 16A.

In such SV magnetoresistive head, as shown in FIG. 16B, a magnetization easy axis M1 of the free magnetic layer 33 is substantially parallel with a surface of a magnetic recording medium 30 and has the same direction as the track core width direction D. Then, a direction of magnetization M10 of the free magnetic layer 33 is inclined by −47° from the magnetization easy axis M1 if the sense current J (5 mA) is supplied via the sense region between two leads 37a, 37b.

A direction of the magnetization M2 of the pinning magnetic layer 35 is directed at an angle of 90° with the track core width direction D by virtue of the exchange coupling force between the pinning magnetic layer 35 and the antiferromagnetic layer 36.

The magnetization easy axis of the free magnetic layer 33 and the magnetization angle of the pinning magnetic layer 35 are set during film forming procedures shown in the first example.

In the SV magnetoresistive head shown in FIGS. 16A and 16B, a resistance change due to the SVMR effect is 5.0% and a resistance change of the free magnetic layer 33 due to the AMR effect is 0.9%. Further, amr which denotes a ratio of the resistance change due to the SVMR effect and the resistance change due to the AMR effect becomes 7%.

In the meanwhile, it has already been described that, if signal magnetic fields output from the magnetic recording medium 30 in the positive direction and signal magnetic fields thereof in the opposite direction are reproduced by the SV magnetic head, these two reproduced signals are formed symmetrically with respect to a certain value. The more perfect symmetry would be of course desired, but actually symmetry is deteriorated due to the AMR effect.

However, a CoFe layer is used as the free magnetic layer 33 in the double-layered structure, not only the SVMR effect of the SV magnetoresistive head is increased but also the AMR effect is increased. In contrast, if boron is included in CoFe, it has been found that the AMR effect can be reduced as explained in the following.

At first, the double-layered structure made of the NiFe layer and the CoFeB layer and with a total film thickness of 75 Å is formed as the first magnetic layer. If the AMR ratio has been investigated by changing a ratio of film thicknesses of the NiFe layer and the CoFeB layer, it has been appreciated that, as indicated by a solid line in FIG. 17, the AMR ratio becomes small with the increase of the thickness of the CoFeB layer. As components of CoFeB, Co is 1 atoms %, Fe is 9 atoms %, and boron is 10 atoms %.

Furthermore, the double-layered structure made of the NiFe layer and the CoFe layer and with a total film thickness of 75 Å is formed as the second magnetic layer. If the AMR ratio has been investigated by changing a ratio of film thicknesses of the NiFe layer and the CoFe layer, it has been appreciated that, as indicated by a broken line in FIG. 17, the AMR ratio becomes large with the increase of the thickness of the CoFe layer.

Figure 17:
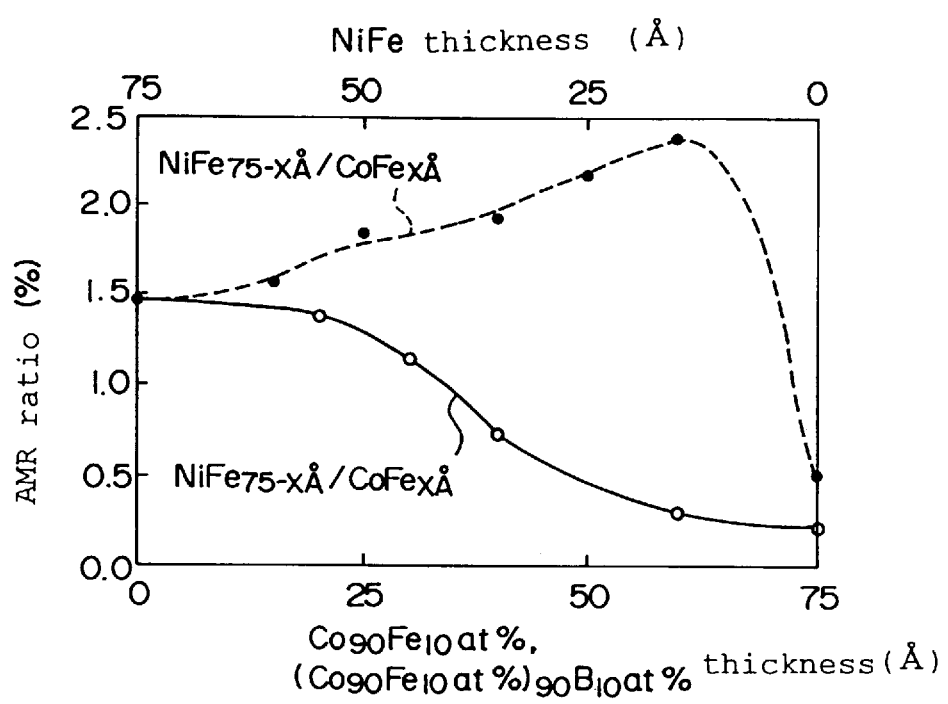
FIG. 17 is a characteristic view showing film thickness dependence of an AMR effect in a NiFe/CoFe double-layered structure, and film thickness dependence of an AMR effect in a NiFe/CoFeB double-layered structure.
Figure 18:
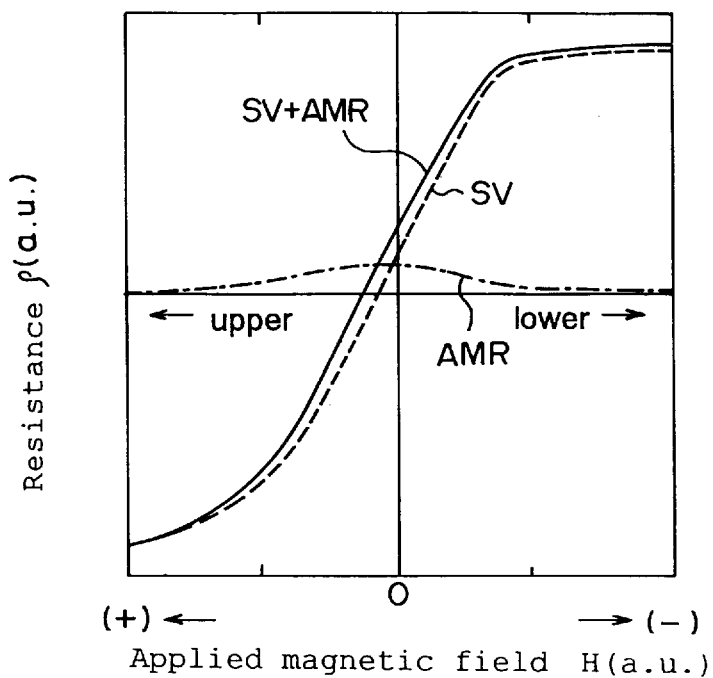
FIG. 18 is a characteristic view showing a $\rho$-H curve of the spinvalve magnetoresistive head in FIG. 16A.

According to FIG. 17, it has been found that the first magnetic layer has a smaller AMR ratio rather than the second magnetic layer. The AMR ratio of the first magnetic layer is reduced much more as the CoFeB layer becomes thicker. In the event that the first magnetic layer is formed of only the CoFeB layer, the AMR ratio is extremely reduced such as about 0.2%. In case the second magnetic layer is formed of only the CoFeB layer, the AMR ratio can be made small but CoFeB is not preferable to use as the free magnetic layer since it has a large coercive force.

Next, if resistance change in the SV magnetoresistive head shown in FIG. 16A according to the externally applied magnetic field has been investigated, resistance change due to the AMR effect can be made extremely small, as shown in FIG. 17. Moreover, an area having linearity of the $\rho$-H curve derived by the total magnetoresistive effect (SVMR+AMR) can be widened to thus improve linearity.

With the use of an inductive magnetic head, magnetic data is written into a first bit on one track of a circular disk type magnetic recording medium 30 to generate a magnetic field in the upward direction and also magnetic data is written into a second bit to generate a magnetic field in the downward direction. Then, such magnetic data are reproduced by the SV magnetoresistive head shown in FIG. 16A.

Figure 19:
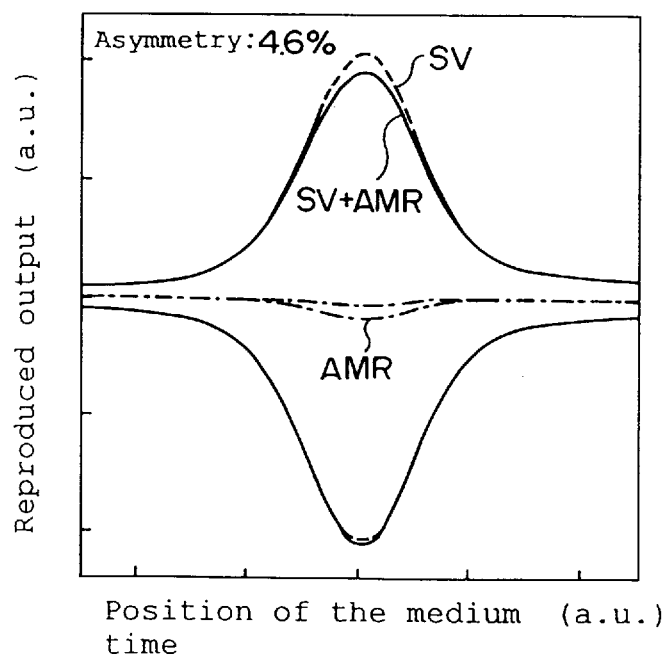
FIG. 19 is a chart showing reproduced output waveforms by the spinvalve magnetoresistive head in FIG. 16A.

For reproduced output waveforms of the magnetic data stored in the first bit, a first reproduced output waveform based on resistance changes due to both the SVMR effect and the AMR effect has been derived as a valley shape shown by a solid line in FIG. 19. For reproduced output waveforms of the magnetic data stored in the second bit, a second reproduced output waveform based on resistance changes due to both the SVMR effect and the AMR effect has been derived as a mountain shape shown by a solid line in FIG. 19.

As a result, since change in the reproduced outputs due to the AMR effect is small, symmetry with a predetermined reproduced output value as a center in the waveform of the first reproduced output and the waveform of the second reproduced output has been improved. Asymmetry has been suppressed to −4.6% in the waveform of the first reproduced output and the waveform of the second reproduced output, which is smaller than asymmetry in the prior art.

(THIRD EXAMPLE)

A head structure will be explained wherein the magnetic layers constituting the SV magnetoresistive head are stacked in reverse order to that in the second example and the direction of magnetization M2 of the pinning magnetic layer and the magnetization easy axis M1 of the free magnetic layer are arranged differently from those in the second example.

Figure 20A:
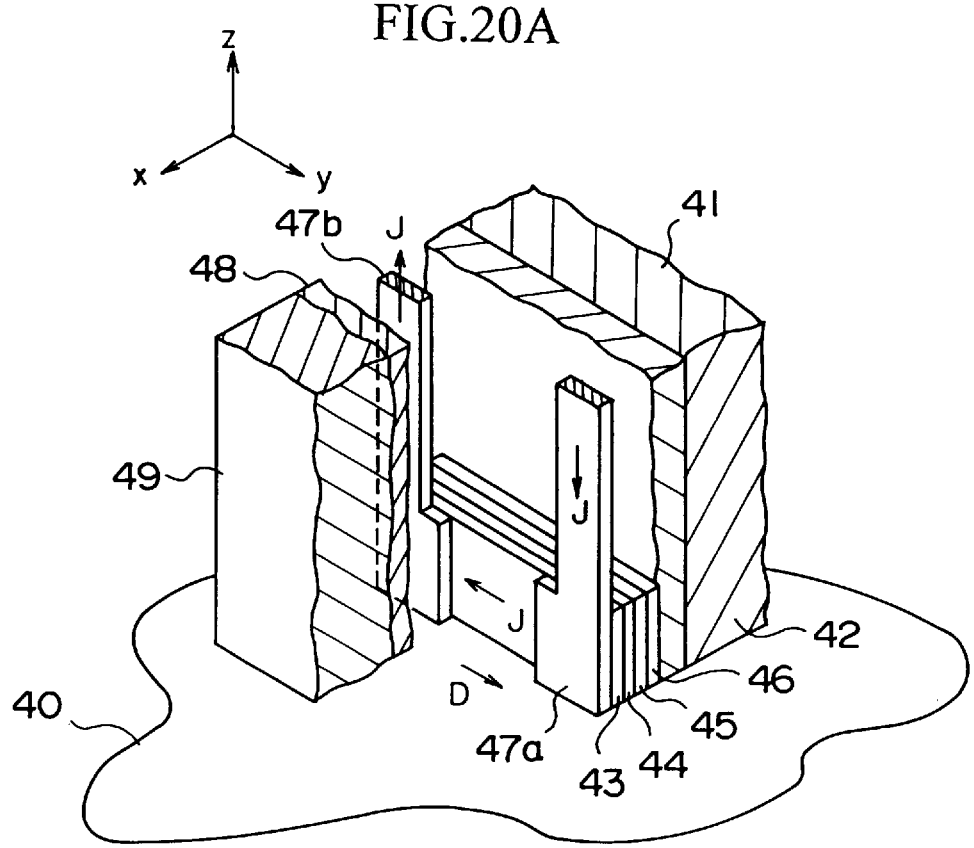
FIG. 20A is a perspective view showing a third concrete example of the spinvalve magnetoresistive head according to the embodiment of the present invention.

In FIG. 20A, a first nonmagnetic insulating layer 42 made of Al2O3 is formed on a first magnetic shielding layer 41 made of NiFe.

An antiferromagnetic layer 46 made of FeMn, a pinning magnetic layer 45 made of (Co90Fe10)90B10, a nonmagnetic intermediate layer 44 made of Cu, and a free magnetic layer 43 made of NiFe are formed in order on the first nonmagnetic insulating layer 42 respectively.

The free magnetic layer 43 has a double-layered structure made of the NiFe layer and the (Co90Fe10)90B10 layer.

The antiferromagnetic layer 46 to the free magnetic layer 43 are mutually connected electrically and are patterned to have a rectangular plan shape on the first nonmagnetic insulating layer 42. Further, a pair of leads 47a, 47b made of gold are formed on both ends of the antiferromagnetic layer 46.

The free magnetic layer 43, the leads 47a, 47b, etc. formed on the first nonmagnetic insulating layer 42 are covered with a second nonmagnetic insulating layer 48. A second magnetic shielding layer 49 made of NiFe is formed on the second nonmagnetic insulating layer 48.

A thickness of the free magnetic layer 43 is 7.5 nm, a thickness of the nonmagnetic intermediate layer 44 is 3 nm, a thickness of the pinning magnetic layer 45 is 2 nm, and a thickness of the antiferromagnetic layer 46 is 50 nm.

Figure 20B:
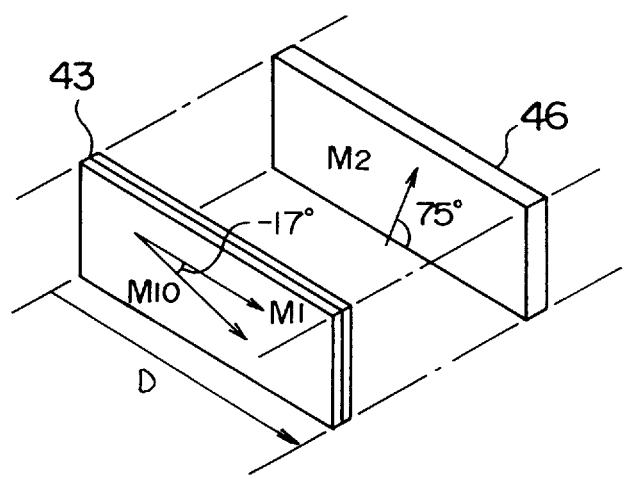
FIG. 20B is a perspective view showing magnetizing directions of a free magnetic layer and a pinning magnetic layer of the magnetic head in FIG. 20A.

In such SV magnetoresistive head, as shown in FIG. 20B, a magnetization easy axis M1 of the free magnetic layer 43 is substantially parallel with the track core width direction D. Then, a direction of magnetization M10 of the free magnetic layer 43 is inclined by −17° from the magnetization easy axis M1 if the sense current J is supplied via the sense region between two leads 47a, 47b. A direction of the magnetization M2 of the pinning magnetic layer 45 is directed at angle 75° with the track core width direction D by virtue of the exchange coupling force between the pinning magnetic layer 45 and the antiferromagnetic layer 46.

In the SV magnetoresistive head, a resistance change due to the SVMR effect is 5.0% and a resistance change of the free magnetic layer 43 due to the AMR effect is 0.9%. In addition, amr which denotes a ratio of the resistance change due to the SVMR effect and the resistance change due to the AMR effect becomes 7%.

Figure 21:
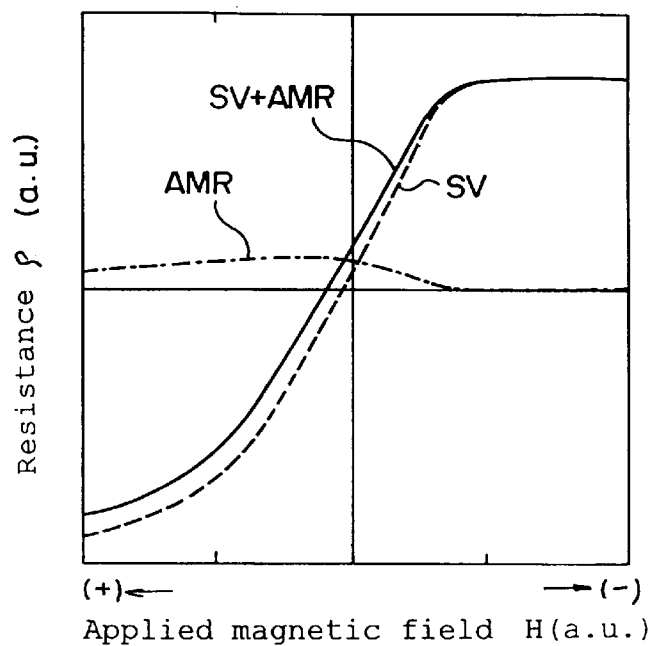
FIG. 21 is a characteristic view showing a ρ-H curve of the spinvalve magnetoresistive head in FIG. 20A.

Next, if the $\rho$-H curve by the SV magnetoresistive head has been investigated, as shown in FIG. 21, resistance change due to the AMR effect can be made extremely small and an area having linearity of the $\rho$-H curve can be widened and thus a linear characteristic can be obtained.

With the use of the inductive magnetic head, magnetic data is written into a first bit on one track of a circular disk type magnetic recording medium 40 to generate a magnetic field in the upward direction and also magnetic data is written into a second bit to generate a magnetic field in the downward direction. Then, such magnetic data are reproduced by the SV magnetoresistive head shown in FIG. 20A.

Figure 22:
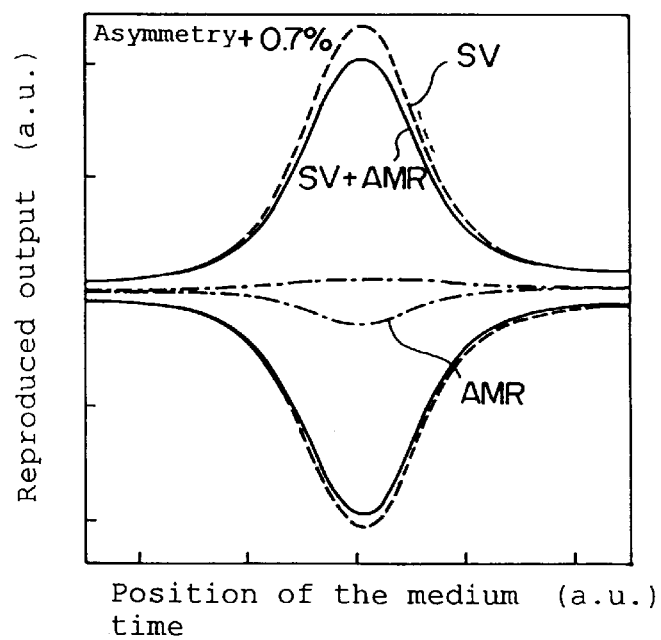
FIG. 22 is a chart showing reproduced output waveforms by the spinvalve magnetoresistive head in FIG. 20A.

For reproduced output waveforms of the magnetic data stored in the first bit, a first reproduced output waveform based on resistance changes due to both the SVMR effect and the AMR effect has been derived as a valley shape shown by a solid line in FIG. 22. For reproduced output waveforms of the magnetic data stored in the second bit, a second reproduced output waveform based on resistance changes due to both the SVMR effect and the AMR effect has been derived as a mountain shape shown by a solid line in FIG. 22.

As a result, since change in the reproduced outputs due to the AMR effect is small, symmetry with a predetermined reproduced output value as a center in the waveform of the first reproduced output and the waveform of the second reproduced output has been improved. Asymmetry has been suppressed to 0.7% in the waveform of the first reproduced output and the waveform of the second reproduced output.

Next, a method of setting magnetization angles of the free magnetic layer and the pinning magnetic layer which are different from those in the first example will be explained hereinbelow.

Figure 14:
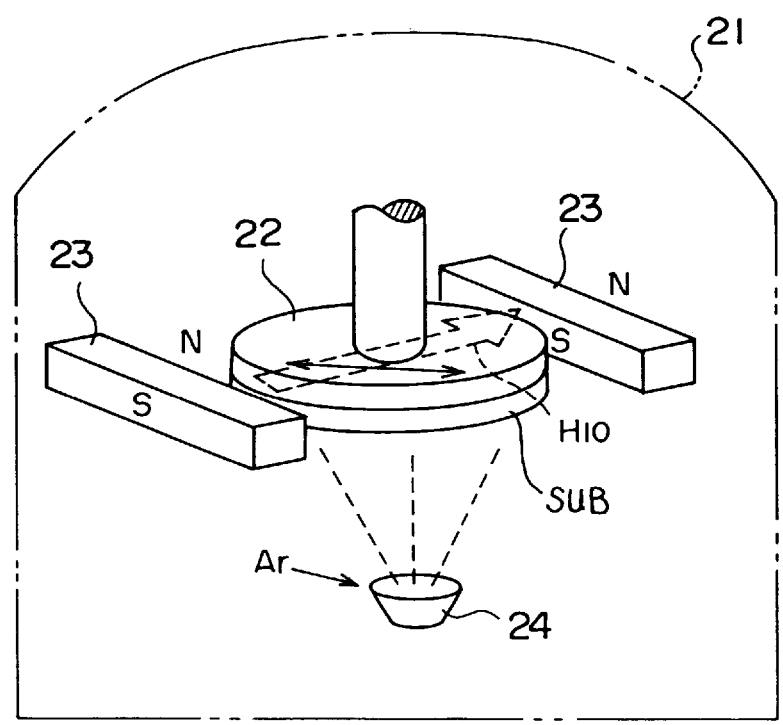
FIG. 14 is a perspective view showing a pertinent portion of a sputter equipment used to manufacture the spinvalve magnetoresistive head according to the embodiment of the present invention.
Figure 23A:
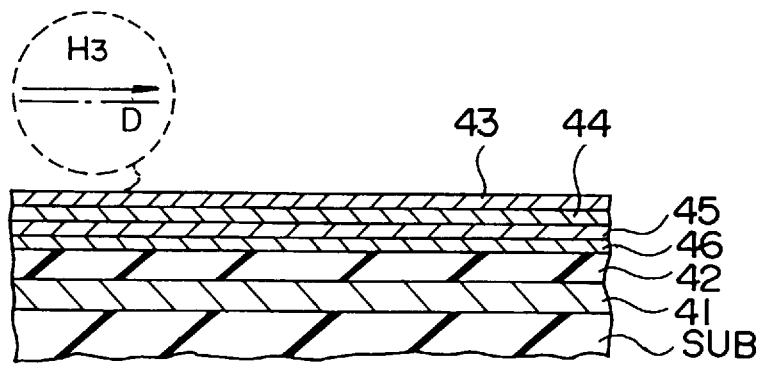
FIGS. 23A to 23C are sectional views illustrating manufacturing steps of the spinvalve magnetoresistive head according to the embodiment of the present invention in FIG. 20A.

By using the sputter equipment having the structure shown in FIG. 14, films are formed on a substrate SUB. In other words, as shown in FIG. 23A, the first magnetic shielding layer 41 and the first nonmagnetic insulating layer 42 are formed on the substrate SUB. Then, the magnetic field H3 is generated by the magnetic field generating means 23 to have 100 Oe in one direction. The antiferromagnetic layer 46, the pinning magnetic layer 45, the nonmagnetic intermediate layer 44, and the free magnetic layer 43 are formed in sequence on the first nonmagnetic insulating layer 42 by sputtering in the atmosphere of the magnetic field H3. The free magnetic layer 43 and the pinning magnetic layer 45 have magnetization easy axes in the same direction by the magnetic field H3. These magnetization easy axes are directed at an angle 0° with the track core width D.

Materials and thicknesses of these layers 43 to 46 are selected in a similar manner to the described above.

Figure 23B:
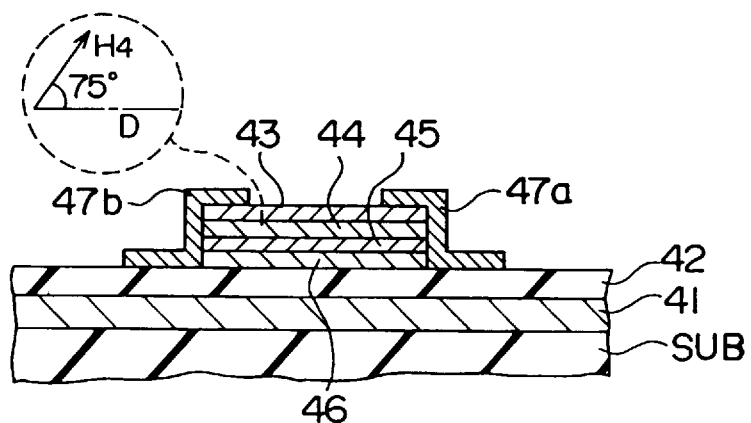

Then, after the substrate SUB is taken out from the sputter equipment, as shown in FIG. 23B, the free magnetic layer 43 to the antiferromagnetic layer 46 are patterned as a rectangle. Longer sides of the rectangle are directed along the direction which coincide with the magnetization easy axis of the free magnetic layer 43. Subsequently, a pair of leads 47a, 47b made of gold or tungsten are formed on both ends of the free magnetic layer 43.

Figure 24:
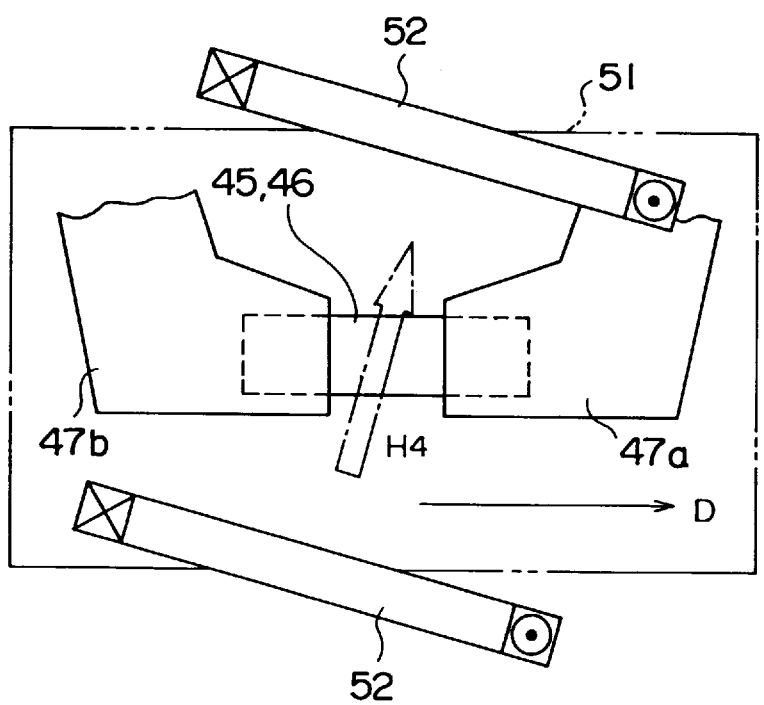
FIG. 24 is a plan view showing alteration of a magnetization direction of a pinning magnetic layer in the spinvalve magnetoresistive head according to the embodiment of the present invention in FIG. 20A.

Subsequently, as shown in FIG. 24, the pinning magnetic layer 45 and the antiferromagnetic layer 46 are placed in the magnetic field H4 of 2500 Oe while the substrate SUB is being heated by a heater 51 to exceed a blocking temperature of the antiferromagnetic layer 46, e.g., 230° C. This magnetic field H4 is generated by a magnetic field generating means 52. The magnetic field generating means 52 is placed to generate the magnetic field H4 at an angle 75° with regard to the track core width D. Intensity of the magnetic field H4 is set to be more than the coercive force of the pinning magnetic layer 45 or the anisotropic magnetic field.

Figure 23C:
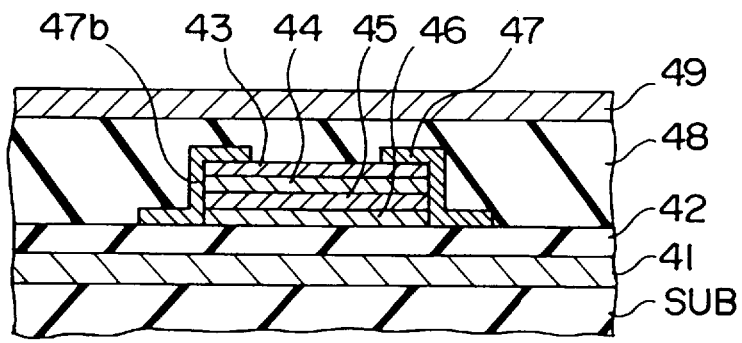

Under such heating condition, if the pinning magnetic layer 45 and the antiferromagnetic layer 46 are placed in the magnetic field, an angle of the magnetization M2 of the pinning magnetic layer 45 is varied in the direction of the magnetic field H4 by virtue of the exchange coupling force between the antiferromagnetic layer 46 and the pinning magnetic layer 45, so that it is varied as shown in FIG. 20B. After this, as shown in FIG. 23C, the second nonmagnetic insulating layer 48 is formed by sputtering to cover the leads 47a, 47b, the free magnetic layer 43, etc. The second magnetic shielding layer 49 made of NiFe is formed on the second nonmagnetic insulating layer 48.

Consequently, a basic structure of the SV magnetoresistive head shown in FIGS. 20A and 20B is completed.

In the first to third examples described above, although FeMn, NiO has been used as the antiferromagnetic layer, other antiferromagnetic material such as PdPtMn may be used. Although boron has been used as material to be added to CoFe used in the antiferromagnetic layer or the free magnetic layer, an element such as carbon, nitrogen may be contained into CoFe. Such element can suppress the AMR effect of the free magnetic layer.

In addition, if an element such as boron, carbon, nitrogen is contained into NiFe used in the antiferromagnetic layer or the free magnetic layer, similar advantage to reduce the AMR effect can be achieved.

Further, as means for directing the magnetization of the free magnetic layer to a predetermined direction, exchange coupling magnetic field with the pinning magnetic layer, sense current magnetic field, electrostatic magnetic field from the pinning magnetic layer, image magnetic field by the magnetic shielding layer, etc. may be used. Of course, because the magnetization angle is influenced by an adjacent magnetic body or a magnetic field caused by an electric current other than those above, such means may be used.

In the third example, thermal treatment in the magnetic field has been carried out to fix the magnetization angle of the pinning magnetic layer after the patterning step. However, if the pinning magnetic layer and the antiferromagnetic layer are formed, then thermal treatment in the magnetic field may be effected before the patterning step, or it may otherwise be effected by incorporating it into the patterning step.

In the foregoing description of the embodiment, although it has been selected as a design target to reduce asymmetry within the range of −10% to +10%, the position of the magnetization angle may be designed to meet particular asymmetry if such particular asymmetry other than this means is desired.

As has been described above, according to the present invention, since the resistance-magnetic field curve (ρ-H curve) can be made linear over the practical range by adjusting magnetization directions of the free magnetic layer and the pinning magnetic layer constituting the spinvalve magnetoresistive head, the spinvalve magnetoresistive effect can be enhanced, or anisotropic magnetoresistive effect of the free magnetic layer can be made small. Thereby, symmetry of the reproduced outputs can be improved still further if the ρ-H curve becomes linear, and asymmetry can be reduced in the range from −10% to +10% so that demodulation can be facilitated. Reduction in the anisotropic magnetoresistive effect is made possible by including elements such as boron, carbon, nitrogen into CoFe and NiFe constituting the free magnetic layer and the pinning magnetic layer.

In addition, adjustment of the magnetization directions of the free magnetic layer and the pinning magnetic layer is made possible by changing the application direction of the external magnetic field in forming the film of these magnetic layers, or changing a magnetization direction of the external magnetic field in a heating atmosphere after the films have been formed.

Various modifications will become possible for those skilled in the art after receiving the teachings of the present disclosure without departing from the scope thereof.

Next, a magnetic head of a magnetic disk drive in which the spin valve magneto-resistive effect device according to the present invension is adopted, and a magnetic recording medium are described with reference to FIG. 25 and FIG. 26.

Figure 25:
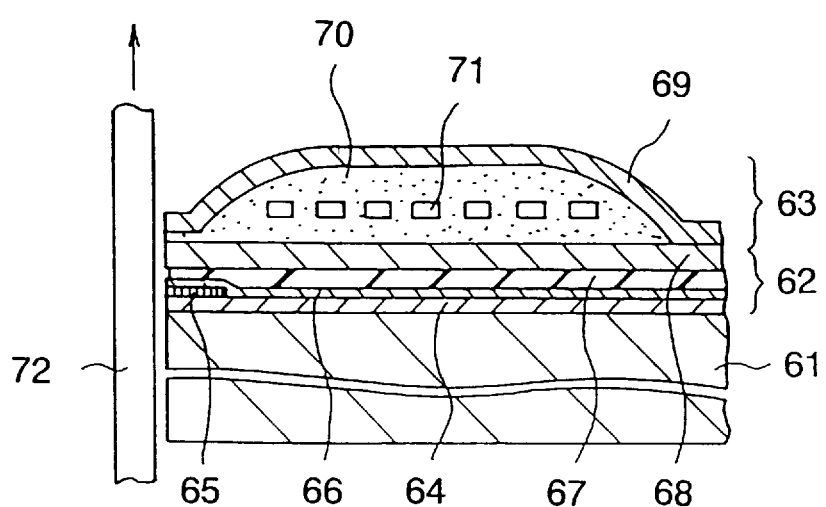
FIG. 25 is a magnetic head for a magnetic disk drive made according to the present invention.

As shown in FIG. 25, a magnetic head of a magnetic disc drive comprises a substrate (or a slider) 61, a reproducing head 62 placed on the substrate 61 and a recording head 63 adjacent to the reproducing head 62. The reproducing head 62 comprises a first magnetic shielding layer 64, the spin valve MR effect device 65 placed on the first magnetic shielding layer 64 through an insulating film (not shown), an electrode terminal (or leading terminal) 66 lead from the spin valve MR effect device 65, an insulating film 67 for covering the spin valve MR effect device 65 and the electrode terminal 66, and a second magnetic shielding layer 68 placed on the insulating film 67.

The configuration of the spin valve MR effect device 65 is shown in FIG. 4A, 11A, 16A and 20A.

The recording head 63 comprises a third magnetic shielding layer 69 placed on the second magnetic shielding layer 68, an insulating layer 70 packed in a space surrounded by the second and third magnetic shielding layers 68 and 67, and a coil 71 buried in the insulating layer 70.

The first, second and third magnetic shielding layers 64, 68, and 70 are respectively formed out of a soft magnetic body, and a gap is formed in a space between a magnetic recording medium 72 and each of the first, second and third magnetic shielding layers 64, 68 and 70.

Figure 26:
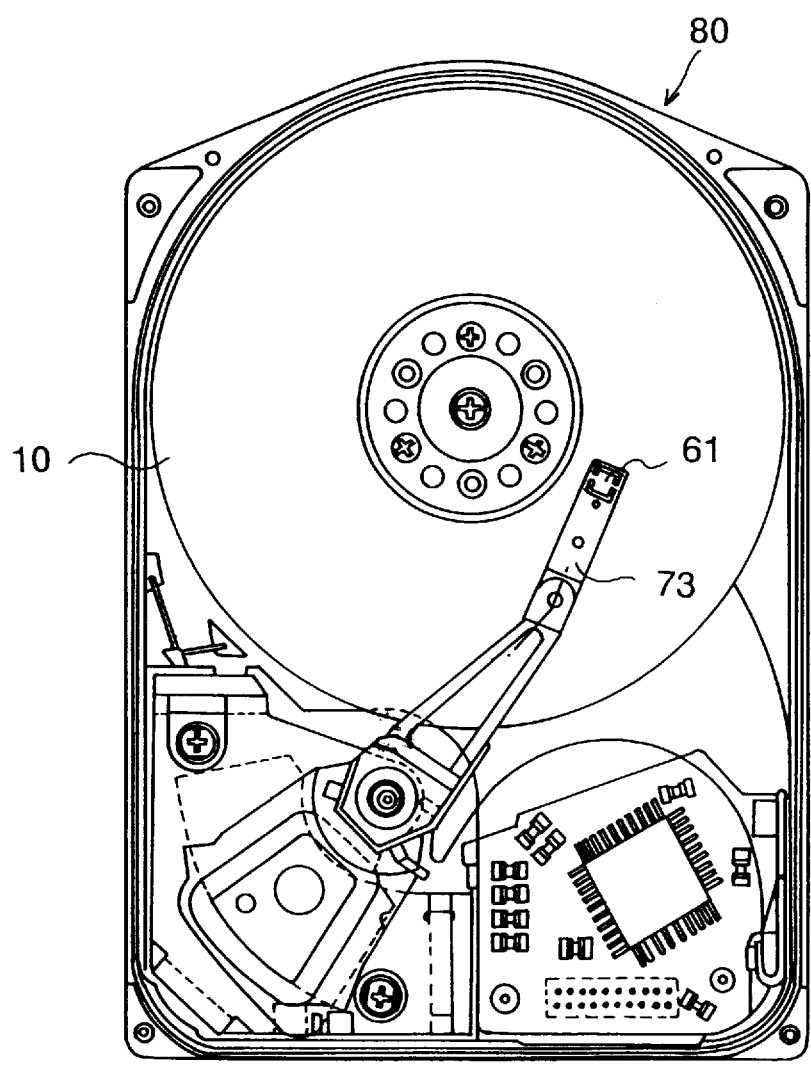
FIG. 26 is a magnetic disk drive made according to the present invention.

As shown in FIG. 26, a magnetic desk drive 80 comprises the magnetic disc 10, and the slider 61 having the spin valve MR head 62 and the recording head 63, and a spring arm 73 supporting the slider 61.

What is claimed is:

1. A spinvalve magnetoresistive head comprising:
   a free magnetic layer made of soft magnetic material;
   a nonmagnetic intermediate layer overlapped with said free magnetic layer; and
   a pinning magnetic layer overlapped with said nonmagnetic intermediate layer and made of soft magnetic material;
   wherein a magnetization angle ($\theta f$) of said free magnetic layer and a magnetization angle ($\theta p$) of said pinning magnetic layer relative to a track core width direction are set such that an electric resistance-magnetic field curve is in a range of −10~+10% in an asymmetry (Asym) defined by the formula;

$$\mathrm{Asym}(\%)=((\cos\theta p/\cos^3\theta f - 4\cdot amr)/(\cos\theta p\cdot\tan\theta f - \sin\theta p - 4\cdot amr\cdot\sin\theta f)\cdot(\partial\sin\theta f/\partial H)+(\partial^2\sin\theta f/\partial H^2)/(\partial\sin\theta f/\partial H))\cdot\Delta H/2$$

where amr is a ratio of resistance change due to spinvalve magnetoresistance effect and resistance change due to an anisotropic magnetoresistance effect.

2. A spinvalve magnetoresistive head of claim 1, wherein an antiferromagnetic layer is formed to contact said pinning magnetic layer, and a magnetization direction of said pinning magnetic layer is fixed by an exchange coupling between said antiferromagnetic layer and said pinning magnetic layer.

3. A spinvalve magnetoresistive head of claim 1, wherein a magnetization direction of said pinning magnetic layer is inclined and non-perpendicular with respect to said track core width direction.

4. A spinvalve magnetoresistive head of claim 1, wherein a magnetization direction of said free magnetic layer is inclined from said track core width direction.

5. A spinvalve magnetoresistive head of claim 3, wherein a magnetization direction of said free magnetic layer and a magnetization direction of said pinning magnetic layer are inclined respectively in an area surrounded by vertices having coordinate values (−10°, 0°), (−40°, 60°), (−40°, 100°), (10°, 130°), (40°, 100°), (40°, 60°), and (10°, 0°) in a coordinate system wherein a first angle relative to said track core width is plotted on a lateral axis and a second angle of magnetization of said pinning magnetic layer relative to said track core width is plotted on a vertical axis.

6. A spinvalve magnetoresistive head of claim 3, wherein an antiferromagnetic layer is formed to contact said pinning magnetic layer, and a magnetization direction of said pinning magnetic layer is fixed by an exchange coupling between said antiferromagnetic layer and said pinning magnetic layer.

7. A spinvalve magnetoresistive head of claim 1, wherein said amr is less than 15%.

8. A spinvalve magnetoresistive head of claim 7, wherein a ratio of resistance change due to said anisotropic magnetoresistive effect of said free magnetic layer is less than 1%.

9. A spinvalve magnetoresistive head of claim 8, wherein said free magnetic layer consists of a multilayer structure made of at least one of the following alloys: CoFe alloy, CoFeX based alloy including an element X, NiFe alloy, and NiFeY based alloy including an element Y.

10. A spinvalve magnetoresistive head of claim 9, wherein atomic partial rates of said CoFe alloy are that Co is 85 to 95 atoms % and Fe is 5 to 15 atoms %.

11. A spinvalve magnetoresistive head of claim 9, wherein atomic partial rates of said CoFeX alloy are that Co is 85 to 95 atoms % and Fe is 5 to 15 atoms %.

12. A spinvalve magnetoresistive head of claim 9, wherein said X is boron, carbon, or nitrogen.

13. A spinvalve magnetoresistive head of claim 8, wherein said free magnetic layer consists of a single layer structure made of at least one of the following alloys: CoFe alloy, CoFeX based alloy including an element X, NiFe alloy, and NiFeY based alloy including an element Y.

14. A spinvalve magnetoresistive head of claim 13, wherein atomic partial rates of said CoFe alloy are that Co is 85 to 95 atoms % and Fe is 5 to 15 atoms %.

15. A spinvalve magnetoresistive head of claim 13, wherein atomic partial rates of said CoFeX alloy are that Co is 85 to 95 atoms % and Fe is 5 to 15 atoms %.

16. A spinvalve magnetoresistive head of claim 13, wherein said X is boron, carbon, or nitrogen.

17. A spinvalve magnetoresistive head of claim 7, wherein a rate of resistance change due to said magnetoresistive effect caused by a difference of respective magnetization angles between said free magnetic layer and said pinning magnetic layer is more than 6%.

18. A magnetic disk drive comprising:
   (a) a spinvalve magnetoresistive head comprising:
   a free magnetic layer made of soft magnetic material,
   a nonmagnetic intermediate layer overlapped with said free magnetic layer, and
   a pinning magnetic layer overlapped with said nonmagnetic intermediate layer and made of soft magnetic material,
   wherein a magnetization angle ($\theta f$) of said free magnetic layer and a magnetization angle ($\theta p$) of said pinning magnetic layer relative to a track core width direction are set such that an electric resistance-magnetic field curve is in a range of −10~10% in an asymmetry (Asym) defined by the formula;

$$\mathrm{Asym}(\%)=((\cos\theta p/\cos^3\theta f - 4\cdot amr)/(\cos\theta p\cdot\tan\theta f - \sin\theta p - 4\cdot amr\cdot\sin\theta f)\cdot(\partial\sin\theta f/\partial H)+(\partial^2\sin\theta f/\partial H^2)/(\partial\sin\theta f/\partial H))\cdot\Delta H/2$$

where amr is a ratio of resistance change due to spinvalve magnetoresistance effect and resistance change due to an anisotropic magnetoresistance effect; and (b) a magnetic recording medium to which said spinvalve magnetoresistance head is arranged to oppose.

19. A method of manufacturing a spinvalve magnetoresistive head comprising the steps of:

forming a free magnetic layer made of soft magnetic material, an intermediate layer made of soft magnetic material, an intermediate layer made of nonmagnetic material, a pinning magnetic layer made of soft magnetic material in forward order or reverse order, wherein a magnetization angle ($\theta f$) of said free magnetic layer and a magnetization angle ($\theta p$) of said pinning magnetic layer relative to a track core width direction are set such that an electric resistance-magnetic field curve is in a range of $-10 \sim +10\%$ in an asymmetry (Asym) defined by the formula, $$Asym(\%) = ((\cos \theta p / \cos^3 \theta f - 4 \cdot amr)/(\cos \theta p \cdot \tan \theta f - \sin \theta p - 4 \cdot amr \cdot \sin \theta f) \cdot (\partial \sin \theta f / \partial H) + (\partial^2 \sin \theta f / \partial H^2)/(\partial \sin \theta f / \partial H)) \cdot \Delta H/2$$

where amr is a ratio of resistance change due to spinvalve magnetoresistance effect and resistance change due to an anisotropic magnetoresistance effect.

20. A method of manufacturing a spinvalve magnetoresistive head of claim 19, further comprising the step of forming an antiferromagnetic layer overlapped with said pinning magnetic layer.

21. A method of manufacturing a spinvalve magnetoresistive head of claim 19, wherein a magnetization direction of said pinning magnetic layer is inclined with respect to said track core width direction from a perpendicular direction.

22. A method of manufacturing a spinvalve magnetoresistive head of claim 19, wherein definition of a magnetization angle of said pinning magnetic layer is executed by applying an external magnetic field upon forming said pinning magnetic layer or said antiferromagnetic layer.

23. A method of manufacturing a spinvalve magnetoresistive head of claim 22, wherein intensity of said external magnetic field is set to be greater than a coercive force or anisotropic magnetic field of said pinning magnetic layer.

24. A method of manufacturing a spinvalve magnetoresistive head of claim 19, wherein definition of a magnetization angle of said pinning magnetic layer is executed by applying a magnetic field to said pinning magnetic layer or said antiferromagnetic layer while heating at a first temperature after said pinning magnetic layer or said antiferromagnetic layer is formed.

25. A method of manufacturing a spinvalve magnetoresistive head of claim 24, wherein said first temperature is at least a blocking temperature of said antiferromagnetic layer.

26. A method of manufacturing a spinvalve magnetoresistive head of claim 24, wherein intensity of said external magnetic field is set to be greater than a coercive force or anisotropic magnetic field of said pinning magnetic layer.

* * * * *

UNITED STATES PATENT AND TRADEMARK OFFICE
CERTIFICATE OF CORRECTION

PATENT NO. : 5,852,531
DATED : December 22, 1998
INVENTOR(S) : Ken'Ichiro Yamada It is certified that error appears in the above-identified patent and that said Letters Patent is hereby corrected as shown below:

Column 2, line 7, delete "a change" and insert --the change-- therefor

Column 2, line 14, delete "a changed" and insert --changed-- therefor

Column 2, line 14, before "change in" insert

--a--

Column 2, line 18, delete " a changed" and insert --changed-- therefor

Column 2, line 18, before "change in" insert

--a--

Column 7, line 52, delete bold "-10°, 0°"

and insert plain text -- - 10°, 0°-- therefor

UNITED STATES PATENT AND TRADEMARK OFFICE
CERTIFICATE OF CORRECTION

PATENT NO. : 5,852,531
DATED : December 22, 1998
INVENTOR(S) : Ken'Ichiro Yamada It is certified that error appears in the above-identified patent and that said Letters Patent is hereby corrected as shown below:

Column 7, line 49, delete bold "-40°" and insert plain text -- -40° -- therefor

Column 12, line 14, delete "mad" and insert --made-- therefor

Column 18, line 20, delete "multilayer" and insert --single layer-- therefor

Signed and Sealed this

Twenty-first Day of December, 1999

Attest:

Q. TODD DICKINSON

*Attesting Officer*  *Acting Commissioner of Patents and Trademarks*